US006698231B2

(12) United States Patent
Gano, III

(10) Patent No.: US 6,698,231 B2
(45) Date of Patent: *Mar. 2, 2004

(54) SYSTEMS AND METHODS FOR STORING ITEMS WITH CONTAINERS

(76) Inventor: John Henry Gano, III, 170 Windview Pl., Alpharetta, GA (US) 30005

( * ) Notice: Subject to any disclaimer, the term of this patent is extended or adjusted under 35 U.S.C. 154(b) by 0 days.

This patent is subject to a terminal disclaimer.

(21) Appl. No.: 10/262,314

(22) Filed: Oct. 1, 2002

(65) Prior Publication Data
US 2003/0037566 A1 Feb. 27, 2003

Related U.S. Application Data

(63) Continuation-in-part of application No. 10/236,764, filed on Sep. 5, 2002, now Pat. No. 6,557,370, which is a continuation-in-part of application No. 10/135,606, filed on Apr. 30, 2002, now Pat. No. 6,502,417, which is a continuation-in-part of application No. 09/817,680, filed on Mar. 26, 2001, now Pat. No. 6,401,484, which is a continuation-in-part of application No. 09/409,319, filed on Sep. 30, 1999, now Pat. No. 6,216,487.

(51) Int. Cl.[7] ............................ F17C 13/00; F25B 15/00
(52) U.S. Cl. ........................................ 62/457.9; 62/101
(58) Field of Search .................. 62/457.5, 457.9, 62/530, 101, 457.2, 457.7, 457.1, 371

(56) References Cited

U.S. PATENT DOCUMENTS

| 3,262,283 | A | | 7/1966 | Taylor ..................... 62/457.5 |
| 3,709,169 | A | * | 1/1973 | Gauger, Jr. et al. ........... 109/29 |
| 4,295,345 | A | | 10/1981 | Atkinson ..................... 62/371 |
| 4,324,111 | A | | 4/1982 | Edwards ..................... 62/457 |
| 4,516,409 | A | | 5/1985 | Hobbs, Jr. et al. ............ 62/457 |
| D293,851 | S | | 1/1988 | Cannon et al. ................. D3/37 |
| 4,741,176 | A | | 5/1988 | Johnson et al. ............... 62/457 |
| 4,812,054 | A | * | 3/1989 | Kirkendall ................... 383/110 |
| 4,989,767 | A | | 2/1991 | Buschbom ................... 224/274 |
| 5,007,250 | A | | 4/1991 | Musielak ..................... 62/372 |
| 5,009,326 | A | * | 4/1991 | Reaves et al. ............... 220/441 |
| 5,115,915 | A | * | 5/1992 | Harris ......................... 206/524 |
| 5,136,981 | A | * | 8/1992 | Barreto, III et al. ....... 119/28.5 |
| D330,631 | S | | 11/1992 | Ledbetter ...................... D3/37 |
| 5,365,739 | A | | 11/1994 | Fetterly ..................... 62/3.62 |
| 5,490,396 | A | | 2/1996 | Morris ....................... 62/457.2 |
| 5,582,028 | A | | 12/1996 | Rilling et al. ................. 62/530 |
| 5,595,069 | A | | 1/1997 | Gies ............................ 62/530 |
| 5,709,914 | A | * | 1/1998 | Hayes ...................... 428/35.1 |
| 5,887,437 | A | | 3/1999 | Maxim .......................... 62/4 |
| 5,899,088 | A | * | 5/1999 | Purdum ....................... 62/371 |
| 5,931,005 | A | | 8/1999 | Garrett et al. ................. 62/86 |
| 6,067,816 | A | | 5/2000 | Hodosh ..................... 62/457.4 |
| 6,116,042 | A | * | 9/2000 | Purdum ....................... 62/371 |
| 6,216,487 | B1 | * | 4/2001 | Gano, III ................... 52/457.5 |
| 6,289,889 | B1 | * | 9/2001 | Bell et al. ............. 126/263.07 |
| 6,401,484 | B2 | | 6/2002 | Gano, III ................... 62/457.5 |

OTHER PUBLICATIONS

"Systems and Methods for Storing Items with Containers," Filed Apr. 30, 2002, Ser. No. 10/135,606.
"Systems and Methods for Storing Items with Containers," Filed Sep. 5, 2002, Ser. No. 10/236,764.

* cited by examiner

Primary Examiner—Melvin Jones
(74) Attorney, Agent, or Firm—Thomas, Kayden, Horstemeyer & Risley, LLP

(57) ABSTRACT

Containers are provided. A representative container comprises: an outer shell defining an interior and having a lid, the outer shell having at least one opening for providing access to the interior, the lid being movable between an open position and a closed position, in the closed position the outer shell encasing the interior, in the open position the lid providing access to the interior, the outer shell comprising cardboard; a storage chamber formed within the interior and communicating with the opening, the storage chamber being adapted to receive at least one item; insulating material disposed within the interior between the storage chamber and the outer shell; and temperature-maintaining material disposed within the interior, the temperature-maintaining material comprising a super-absorbent.

60 Claims, 22 Drawing Sheets

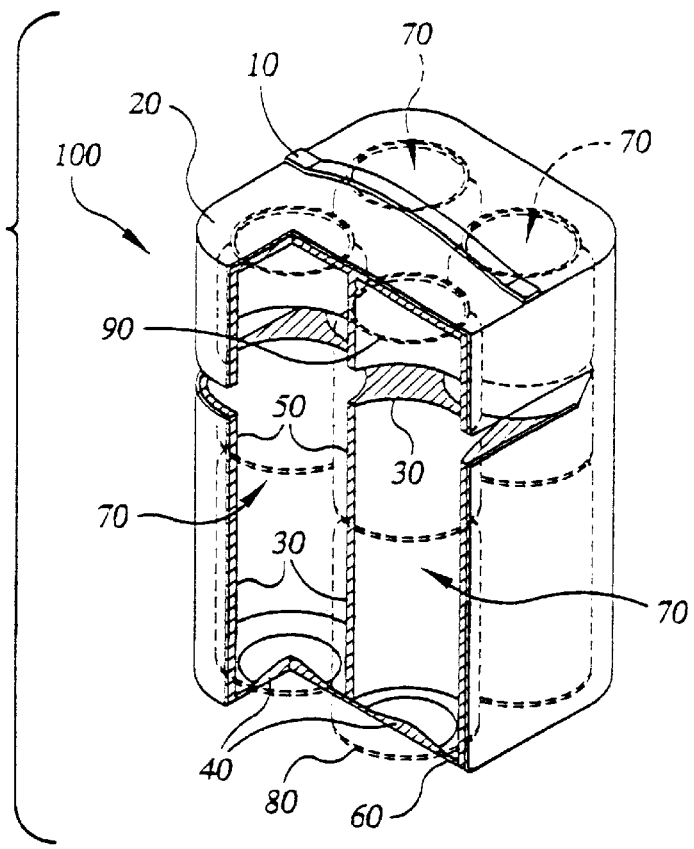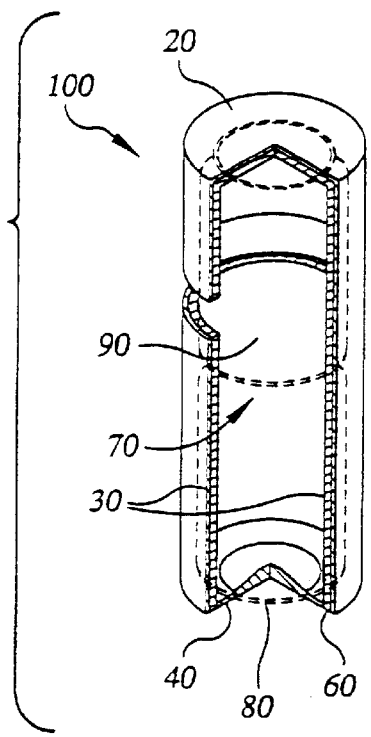

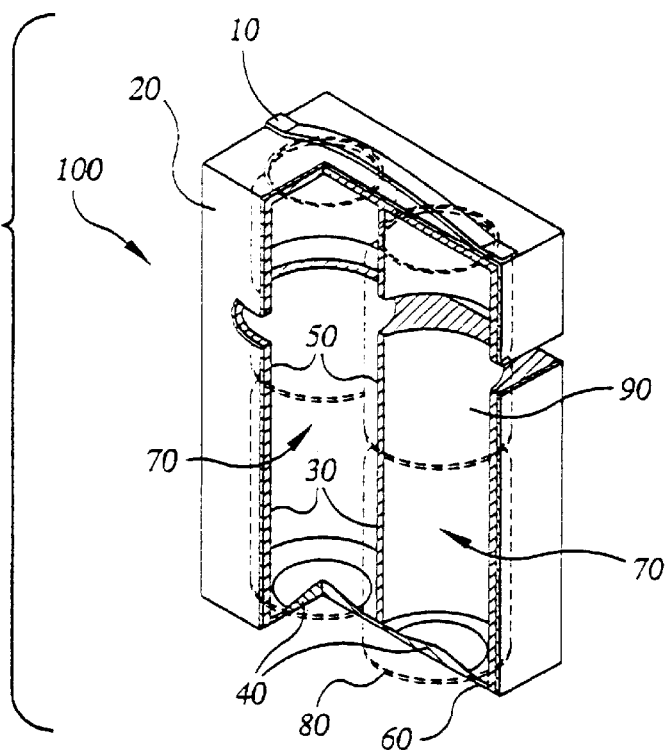
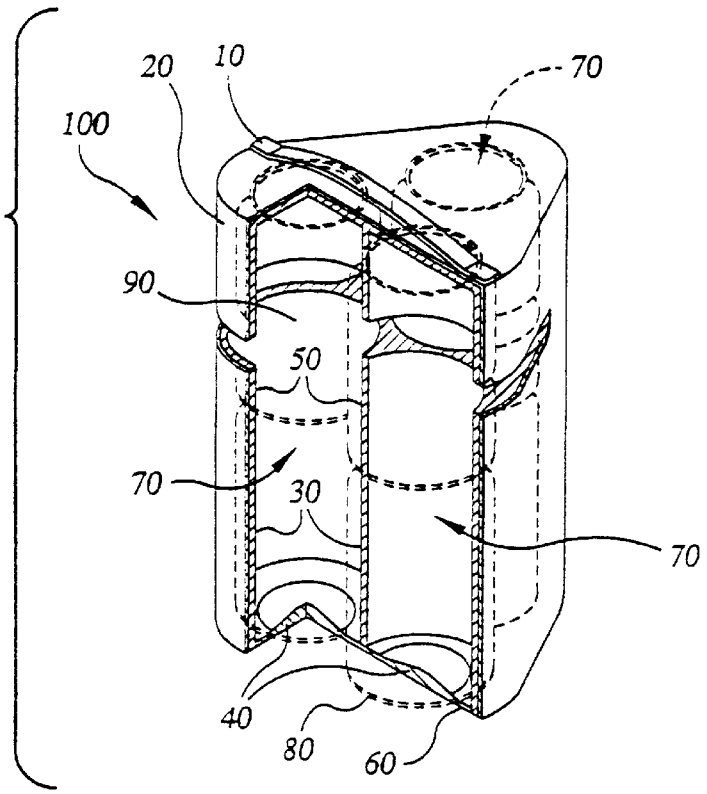

SYSTEMS AND METHODS FOR STORING ITEMS WITH CONTAINERS

CROSS-REFERENCE TO RELATED APPLICATION

This application is a Continuation-in-Part Application based on and claiming priority to U.S. Patent Application entitled, "Systems and Methods for Storing Items with Containers," having Ser. No. 10/236,764, filed on Sep. 5, 2002, now U.S. Pat. No. 6,557,370, issued on May 6, 2003 which is a Continuation-in-Part Application based on and claiming priority to U.S. Patent Application entitled "Systems and Methods for Storing Items with Containers," having Ser. No. 10/135,606, filed on Apr. 30, 2002, now U.S. Pat. No. 6,502,417, issued on Jan. 7, 2003, which is a Continuation-in-Part Application based on and claiming priority to U.S. Patent Application entitled, "Transport Container," having Ser. No. 09/817,680, filed on Mar. 26, 2001, now U.S. Pat. No. 6,401,484, issued on Jun. 11, 2002, which is a Continuation-in-Part Application based on and claiming priority to U.S. Patent Application entitled, "Re-Freezable Beverage Cooler," having Ser. No. 09/409,319, filed Sep. 30, 1999, now U.S. Pat. No. 6,216,487, issued on Apr. 17, 2001, each of which is incorporated herein by reference.

BACKGROUND OF THE INVENTION

1. Field of the Invention

The present invention generally relates to containers and, in particular, to systems and methods that utilize containers for storing items so that the temperature of the items may be maintained, raised and/or cooled as desired.

2. Description of the Related Art

Oftentimes, it is desirable to transport items, such as beverages, for example, in a portable container or cooler so that convenient access to the beverages is provided, such as while playing golf, attending sporting events, going to a beach, etc. Hereinbefore, such a container typically has been formed of either insulating material, for maintaining the temperature of previously chilled beverages, or a combination of insulating material and cooling material, such as blue ice, for instance, whereby the cooling material chills a beverage stored within the container and the insulating material tends to maintain the temperature of both the cooling material and the chilled beverages.

For example, U.S. Pat. No. 4,741,176, issued to Johnson, et al., discloses a beverage cooler, which includes a cylindrical freezer-pack insert to be placed into a cup, and a cover. In an embodiment of the Johnson device, the cylindrical freezer-pack insert includes removable sections to change its size, and removable plugs for putting coolant fluid into the removable sections. Since, however, the Johnson device is adapted for inserting within an individual cup, the device is limited for use in cooling one beverage at a time.

As another example, U.S. Pat. No. 4,295,345, issued to Atkinson, discloses a cooling container for canned beverages. The Atkinson device includes a reusable concave container for carrying and cooling canned beverages having a bottom section containing a plurality of cylindrical compartments, a top section containing corresponding compartments having a slow warming cooling gel in the upper end thereof, and a shoulder strap for carrying the container. While it is apparent that the Atkinson device addresses the problem of cooling multiple beverages simultaneously, it does not, however, provide for increased cooling efficiency of the beverages stored therein, as the cooling gel is stored only in the upper end of the container.

It also may be desirable to transport other items in a portable container. By way of example, various items, such as fluids, organs and/or other medical-related items, may require transport. Heretofore, these items typically have been transported within containers that are not specifically adapted for these items. This inadequacy also is prevalent in fields other than the medical industry. Therefore, there is a need for improved coolers which address these and/or other shortcomings of the prior art.

BRIEF SUMMARY OF THE INVENTION

Briefly stated, the present invention is directed to systems and methods that utilize containers for storing and/or transporting items. In this regard, one such method includes: A method for storing items, said method comprising: providing a container, the container having: an outer shell defining an interior and having a lid, the outer shell having at least one opening for providing access to the interior, the lid being movable between an open position and a closed position, in the closed position the outer shell encasing the interior, in the open position the lid providing access to the interior, the outer shell comprising cardboard; a storage chamber formed within the interior and communicating with the opening, the storage chamber being adapted to receive at least one item; insulating material disposed within the interior between the storage chamber and the outer shell; and temperature-maintaining material disposed within the interior, the temperature-maintaining material comprising a super-absorbent.

An embodiment of a container in accordance with the invention comprises: an outer shell defining an interior and having a lid, the outer shell having at least one opening for providing access to the interior, the lid being movable between an open position and a closed position, in the closed position the outer shell encasing the interior, in the open position the lid providing access to the interior, the outer shell comprising cardboard; a storage chamber formed within the interior and communicating with the opening, the storage chamber being adapted to receive at least one item; insulating material disposed within the interior between the storage chamber and the outer shell; and temperature-maintaining material disposed within the interior, the temperature-maintaining material comprising a super-absorbent.

Another embodiment of a container in accordance with the invention comprises: an outer shell defining an interior; an insulating material disposed at least partially within the interior, the insulating material comprising soy oil polyol; and a temperature-maintaining material disposed within the interior, the temperature-maintaining material comprising an acrylate-based super-absorbent.

Another embodiment of a container in accordance with the invention comprises an outer shell defining an interior, the outer shell defining an interior, the outer shell comprising at least one of a ceramic-containing material and an epoxy; insulating material disposed at least partially within the interior, the insulating material comprising at least one of soy oil polyol foam, urethane foam and polystyrene foam; and a temperature maintaining material disposed within the interior, the temperature-maintaining material comprising a super-absorbent.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEW OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2 is a partially cut-away, perspective view of an alternative embodiment of the present invention with representative beverage containers shown in phantom lines.

FIG. 3 is a partially cut-away, perspective view of an alternative embodiment of the present invention with representative beverage containers shown in phantom lines.

FIG. 4 is a partially cut-away, perspective view of an alternative embodiment of the present invention with representative beverage containers shown in phantom lines.

FIG. 5 is a partially cut-away, perspective view of an alternative embodiment of the present invention with representative beverage containers shown in phantom lines.

DETAILED DESCRIPTION

Figure 1:
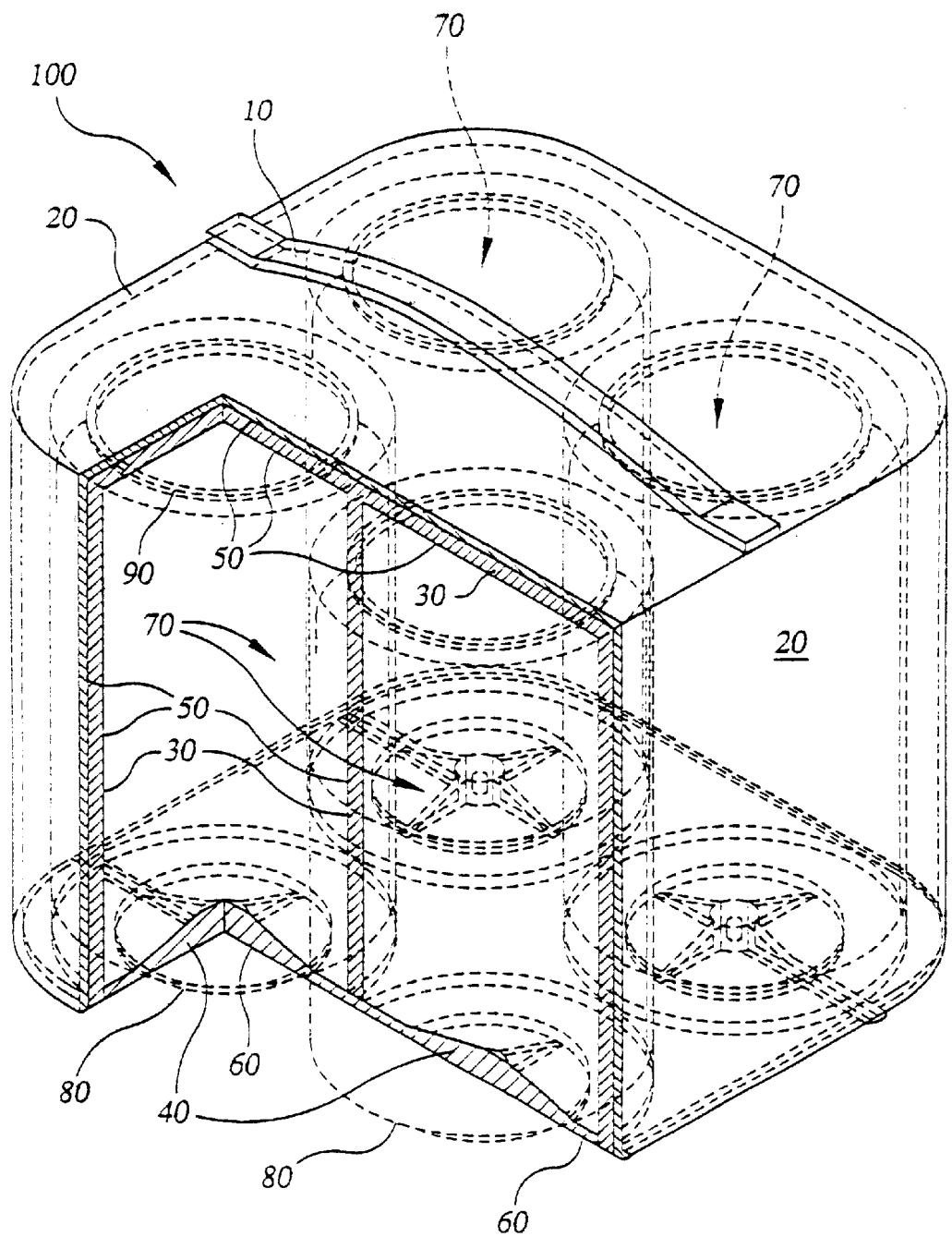
FIG. 1 is a partially cut-away perspective view of a preferred embodiment of the present invention with representative beverage containers shown in phantom lines.

Reference will now be made in detail to the drawings, wherein like reference numerals indicate like parts throughout the several views. As shown in FIG. 1, a preferred embodiment of the cooler 100 of the present invention incorporates an outer shell 20, preferably formed of a durable material, such as molded plastic, or other suitable materials, and which defines an interior. Preferably, one or more storage chambers 70 are provided within the interior. Storage chambers 70 preferably are adapted to receive one or more beverage containers 90, such as conventional cans or bottles, with the cooler being constructed so as to chill the beverages containers 90, and/or maintain the beverages of the containers 90 at a suitable chilled temperature, as described hereinafter.

Access to the storage chamber(s) 70, such as for the insertion and/or removal of beverage containers 90, preferably is facilitated by one or more caps 80 which removably engage the shell 20. For example, in the preferred embodiment depicted in FIG. 1, a plurality of caps 80 are provided along a lower surface of the shell 20, with each of the caps being constructed as a "screw-off" cap so that engagement of each of the caps with the shell is facilitated by rotating the cap relative to the shell. However, in other embodiments, engagement of the cap and shell may be facilitated by a friction fit, or other suitable means.

Preferably, storage chamber(s) 70 are defined by inner walls of a re-freezable material chamber 50 which is adapted to receive and retain a quantity of re-freezable material 30. Preferably, the re-freezable material chamber 50 is adapted to conform to the exterior surface of a beverage container 90 and, therefore, fills the interstices formed between the various containers. Preferably, in embodiments which are adapted for receiving one beverage container within each storage chamber, each beverage container is surrounded and engaged by the inner wall of the refreezable material chamber, i.e., on all of its sides and its top.

An insulation chamber 40 preferably is provided between the re-freezable material chamber 50 and the shell 20. Preferably, insulation chamber 40 is filled with an efficient insulating material 60, such as polyurethane foam or other suitable material. So configured, each beverage container inserted within a storage chamber 70 is encased by a layer of re-freezable material, as well as within a layer of insulation for maintaining the temperature of the re-freezable material at a suitable temperature.

Additionally, cooler 100 may be provided with a handle 10 so that the cooler is easily transportable. The handle may be formed of numerous suitable materials, such as plastic or leather, for instance, and may be fastened to the cooler in any conventional manner so that the weight of the cooler and any beverage container stored therein does not cause the handle to separate and detach from the shell 20.

As depicted in FIGS. 2–5, various numbers and arrangements of storage containers 70 may be provided for storing and cooling various numbers of beverage containers 90.

Figure 6:
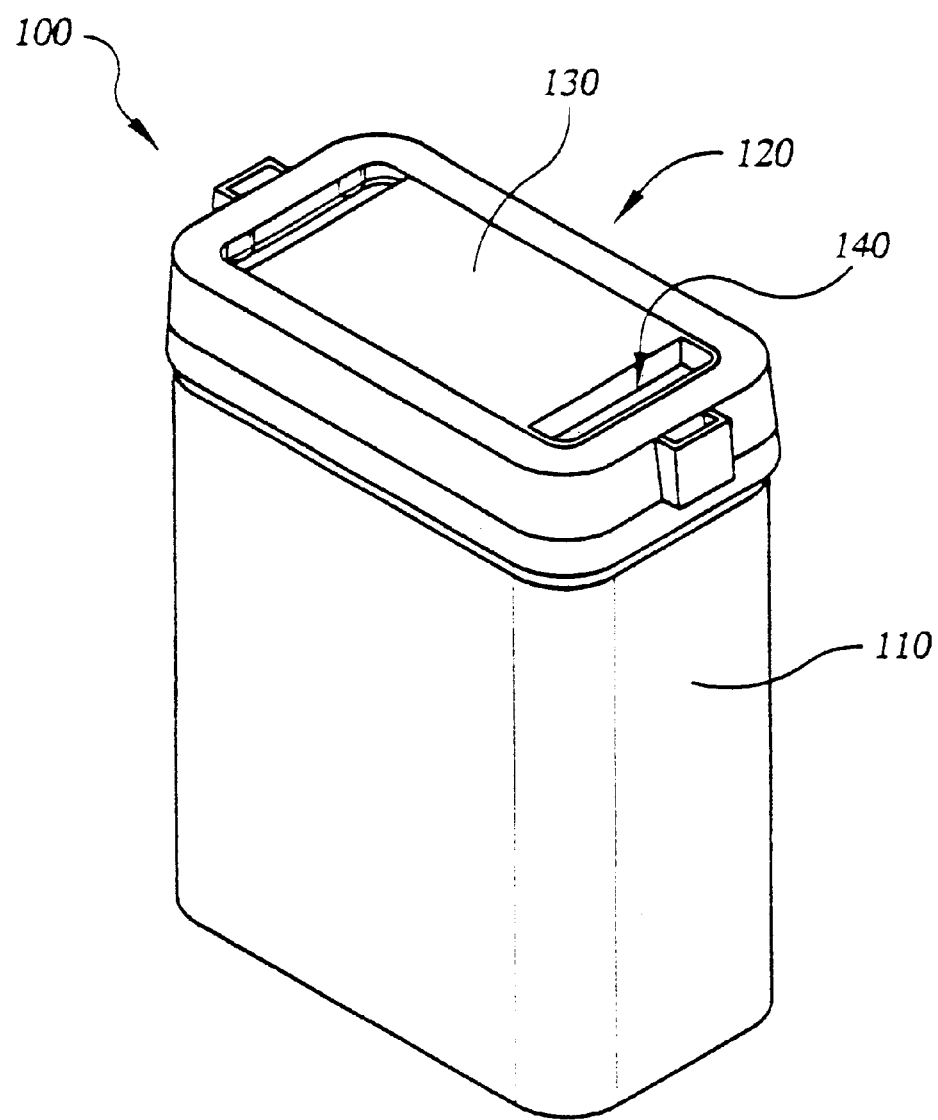
FIG. 6 is a perspective view of an alternative embodiment of the present invention.

Reference will now be made to FIGS. 6–9, which depict a representative alternative embodiment of the cooler of the present invention. As shown in FIG. 6, cooler 100 includes an outer shell 110 and a lid assembly 120. As described in greater detail hereinafter, shell 110 and lid 120 cooperate to form a protective enclosure for transporting and/or storing items placed within an interior of the container. Preferably, shell 110 is formed of a substantially rigid material that is adapted for protecting items placed within the container. Additionally, lid 120 preferably is formed, at least partially, of substantially rigid material.

As shown in FIG. 6, lid 120 incorporates a cap or door 130 that is adapted to alternately provide and deny user access to the interior of the container. In the embodiment depicted in FIG. 6, door 130 includes a recess 140 that is adapted to receive the fingers of a user so that the user may urge the door from its closed to its open position.

Figure 7:
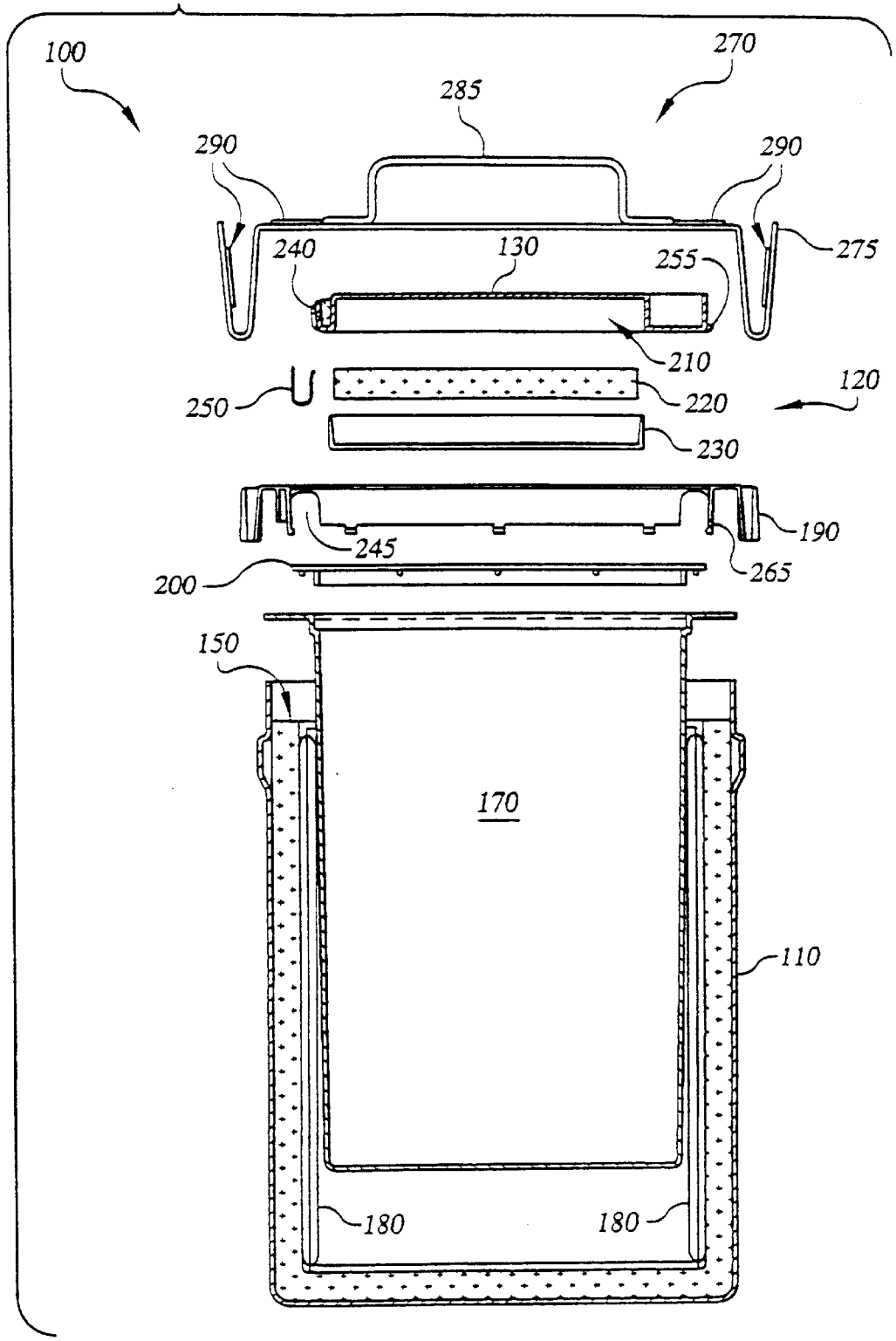
FIG. 7 is a partially-exploded,cut-away, side view of the embodiment depicted in FIG. 6.

Referring now to FIG. 7, assembly of the container 100 will be described in greater detail. As shown in FIG. 7, a layer(s) of insulation 150 preferably is disposed within the interior of the container. In some embodiments, insulation 150 is provided adjacent an interior surface of the outer shell. An insert 160 is adapted to be received within the interior. The insert defines a storage chamber 170, which is adapted to receive one or more items. Re-freezable material 180 preferably is disposed between an exterior surface of the insert and the layer(s) of insulation 150. Engagement of the insert with the outer shell also may tend to retain the insulation 150 and refreezable material 180 in position within the interior.

As shown in greater detail in FIG. 7, lid 120 includes a top 190 as well as door 130. Top 190 is adapted to engage the outer shell so as to provide a mounting platform for the door. In some embodiments, a gasket 200 is provided between the top and the insert.

Insulation also may be provided within the door. More specifically, the door may be formed with an insulation-receiving recess 210 that is sized and shaped for receiving a layer(s) of insulation 220. In order to maintain the insulation 220 in position relative to the door, a door insulation retainer 230 may be provided that is adapted to securely engage the door.

In order to facilitate moving the door from its closed position (depicted in FIG. 6) to its open position (depicted in FIG. 8), pivots 240 of the door are received within orifices 245 so as to enable pivoting of the door about the pivots. In some embodiments, a spring 250 is provided for securing the door in the closed position. In particular, spring 250 urges a latch 255 of the door toward engagement with a recess 265. Thus, when the latch and recess are aligned, the latch forms an interference fit, thereby tending to maintain the door in its closed position.

As shown in FIG. 7, a handle assembly may be provided for facilitating transport of the container. Preferably, handle assembly 270 includes a strap portion 275. Each end of the strap portion preferably is adapted to engage a strap guide 280 of the container, which may be formed on the lid, for example. In some embodiments, a handle may be provided at an intermediate portion of the handle assembly. In these embodiments, the handle 285 preferably is formed of a substantially rigid material and is mounted to the strap so as to provide a portion of the handle assembly that is readily suited for grasping by the hand of a user. In the embodiment depicted in FIG. 7, ends of the strap are secured to the strap guides by hook and loop material 290 although, in other embodiments, various other mechanisms for securing the strap to the container may be utilized.

Figure 8:
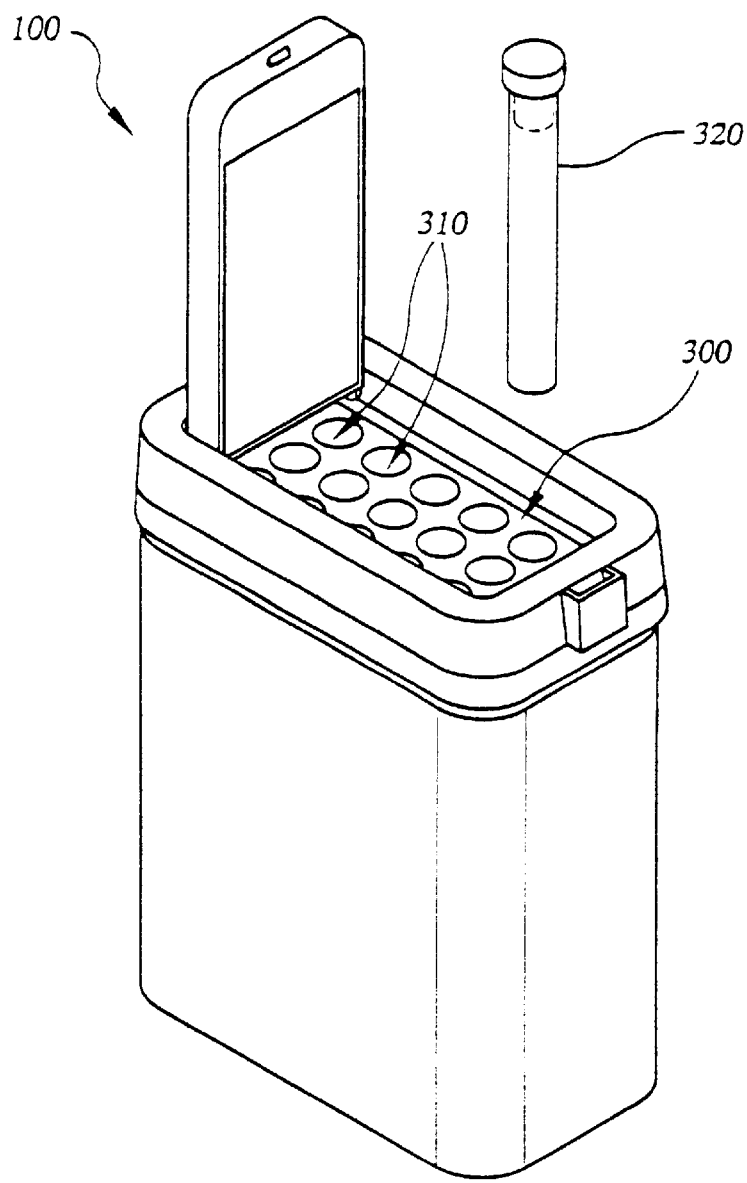
FIG. 8 is a perspective view of the embodiment depicted in FIGS. 6 and 7, showing the lid in an open position.
Figure 9:
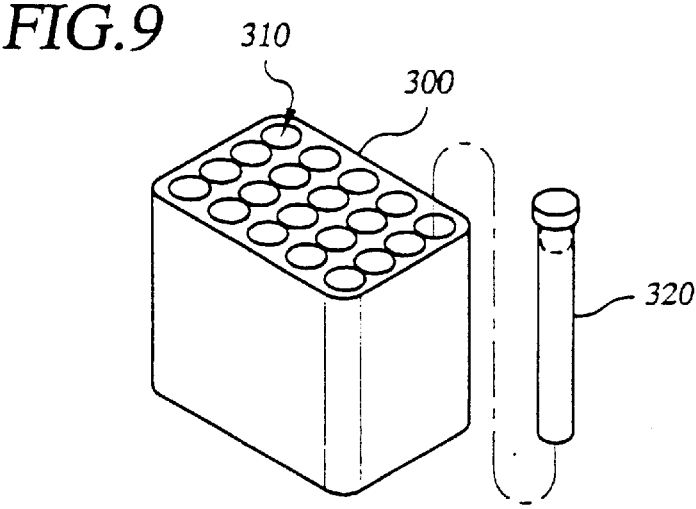
FIG. 9 is a preferred embodiment of the item retainer, which may be utilized in the container of FIGS. 6–8.

As shown in FIGS. 8 and 9, the container 100 may be configured with an item-receiving retainer 300. Item-receiving retainer 300 defines one or more item-receiving cavities 310 that may be specifically sized and shaped to conform to an exterior surface of an item to be received therein. For example, the item-receiving cavities 310 depicted in FIG. 8 are each specifically configured to receive a test tube or vile 320. Preferably, an exterior surface of the item-receiving retainer is adapted to engage an interior surface of the insert and is configured so that cooperation of the lid and the outer shell maintains the item-receiving retainer within the storage chamber.

In addition to substantially maintaining relative positions of items stored within the container, the material of the item-receiving retainer may be suitably selected so as to provide shock absorbing. In these embodiments, such as those embodiments formed of a foamed material, for example, the item-receiving retainer may reduce the tendency of an item to break within the container.

In some embodiments, various configurations of item-receiving retainers may be provided. More specifically, multiple item-receiving retainers may be provide with a given container, with each item-receiving retainer being adapted to receive various configurations of items for storage within the container. So provided, the container may be adapted so as to specifically accommodate transporting and cooling of particularly sized and shaped items.

Figure 10:
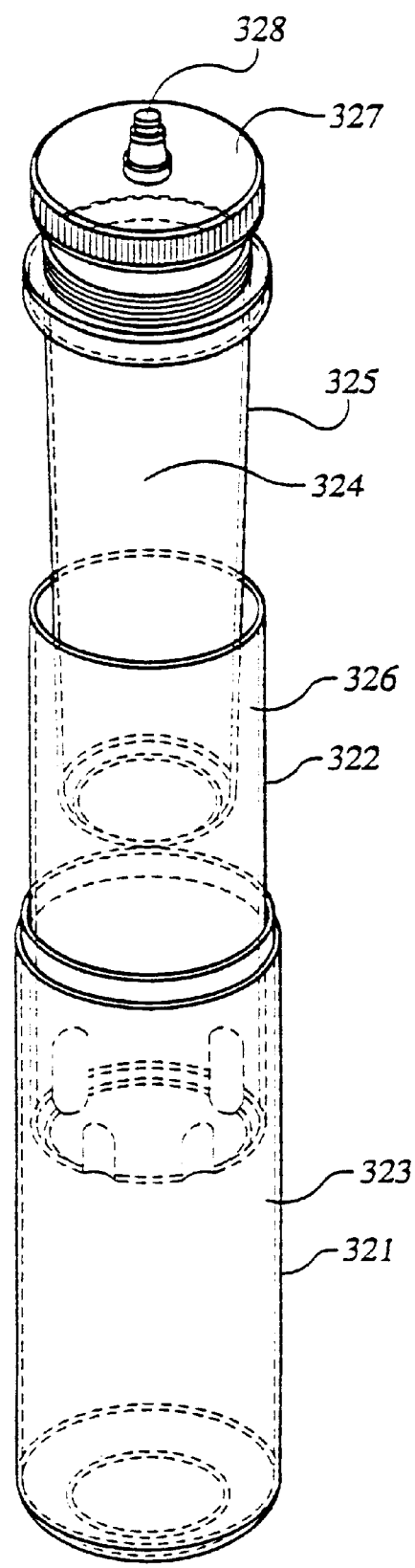
FIG. 10 is a partially-exploded,schematic view of another embodiment of a container of the present invention.

Another embodiment of a container in accordance with the present invention is depicted schematically in FIG. 10. As shown in FIG. 10, container 100 includes an outer shell 321 that is sized and shaped to receive an insert 322. When insert 322 is received by shell 321, a gap 323 is formed. Insulation (not shown) can be placed in gap 323 between the outer shell and the insert.

Container 100 of FIG. 10 also includes a storage chamber 324 that is defined by an inner shell 325. Inner shell 325 is received by insert 322 so that a second gap 326 is formed. Gap 326 is adapted to receive temperature-maintaining material (not shown) so that the temperature-maintaining material is located about the sides and/or bottom of an item placed within the storage chamber.

Access to the storage chamber is provided by a removable lid 327. Lid 327 can optionally house insulation and/or temperature-maintaining material. In the embodiment of FIG. 10, the lid includes a nozzle 328 that allows liquid to be drawn from the storage chamber when in an open position. So configured, the container can be used to store various types of items, such as liquids (which can be accessed via the nozzle) and beverage cans (which can be accessed by opening the lid).

Note, the outer shell, insert and inner shell can be held in an assembled configuration by various techniques. For instance, when a foam-type insulation is used, the foam can be injected into gap 323 so that a portion of the foam contacts the inner shell. This enables the insulation to perform as an adhesive for bonding the inner shell to the outer shell and insert.

Figure 11:
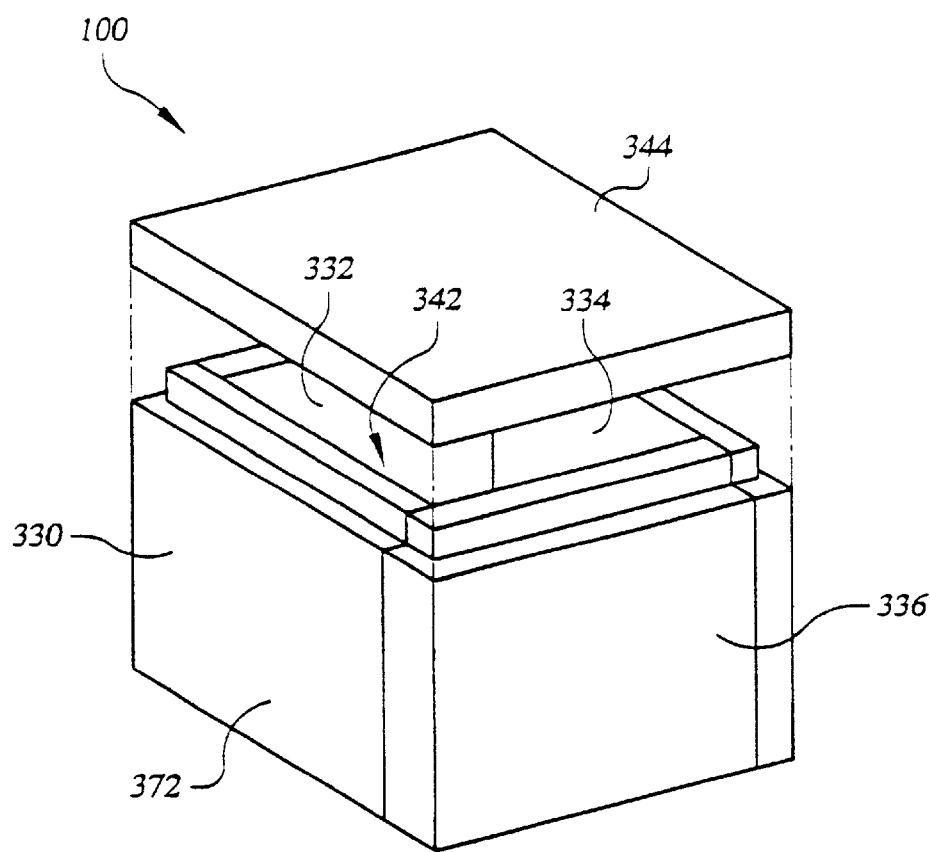
FIG. 11 is a partially-exploded, schematic view of another embodiment of a container of the present invention.
Figure 12:
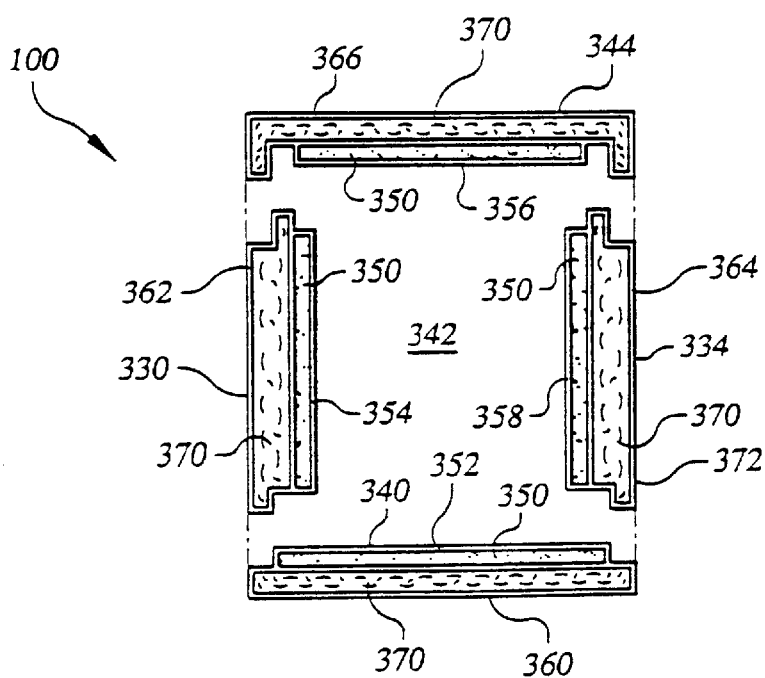
FIG. 12 is a partially-exploded, schematic, cut-away view of the embodiment of FIG. 10.

Reference will now be made to FIGS. 11 and 12, which depict another embodiment of a container 100 in accordance with the present invention. As shown in FIG. 11, container 100 includes multiple side surfaces that extend upwardly from a base (shown more clearly in FIG. 12). In particular, container 100 includes sidewalls 330, 332, 334 and 336, each of which extends upwardly from base 340. The sidewalls and the base define an interior storage chamber 342 that can be enclosed when a lid 344, e.g., a removable lid, is used to engage the sidewalls.

As shown in FIG. 12, the base, sidewalls and lid are shaped to interlock with each other so that temperature-maintaining material 350 surrounds the storage chamber. More specifically, each of the base, sidewalls and lid includes a temperature-maintaining material chamber, e.g., chambers 352, 354, 356 and 358, that retains temperature-maintaining material. By way of example, the temperature-maintaining material can be a refreezable material.

Preferably, each of the base, sidewalls and lid, in addition to incorporating a temperature-maintaining material chamber and associated temperature-maintaining material, includes an insulation chamber (360, 362, 364, 366) with insulation 370 arranged therein. Note, the various chambers can be defined by a substantially rigid material that also can be used to form the exterior shell 372 of the container.

Attachment of the base, sidewalls and lid to each other can be accomplished in numerous manners. By way of example, one or more of the sidewalls could be hingedly attached to the base. Hinged attachment can be facilitated by hinge mechanisms (not shown) or by a portion of the material of the exterior shell (not shown), for example, that is adapted to flex or bend to accommodate movement of the sidewall with respect to the base. Note, several different attachment configurations will be described later.

Figure 13:
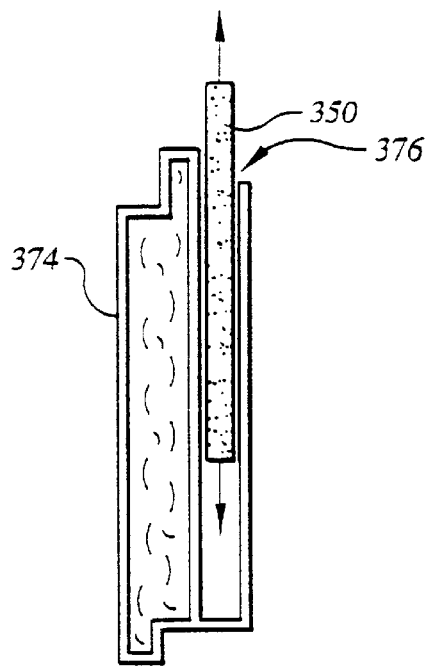
FIG. 13 is a schematic, cut-away view of a sidewall of an alternative embodiment of a container of the present invention, showing insertion of temperature-maintaining material within a temperature-maintaining material chamber.

As shown in FIG. 13, a container of the invention can include one or more temperature-maintaining material chambers that are adapted to permit removal of the temperature-maintaining material. As shown in FIG. 13, this can be accommodated by a sidewall 374 including an opening 376. The opening 376 is sized and shaped so that the temperature-maintaining material 350 can be removed, such as for freezing, and then re-inserted into the chamber through the opening for use. Note, depending upon the type of temperature-maintaining method used, the material may be packaged so that it does not break apart.

Various insulation and temperature-maintaining materials can be used. For example, polyurethane foam can be used as the insulation, and a gel-forming polymer such as polyacrylate/polyalcohol copolymers can be used as the temperature-maintaining material. Clearly, various other materials could be used depending upon characteristics such as the intended operating temperature range, desired weight of the container, and stability/compatibility within the item (s) stored, among others. The selection of the particular materials is considered within the knowledge of one of skill in the art.

Clearly, various other arrangements can be used for providing the outer shell, insulation, and temperature-maintaining material so that an item placed within the storage chamber of the container can be protected and/or have its temperature maintained. Cut-away views of additional configurations are depicted in FIGS. 14 and 15.

Figure 14:
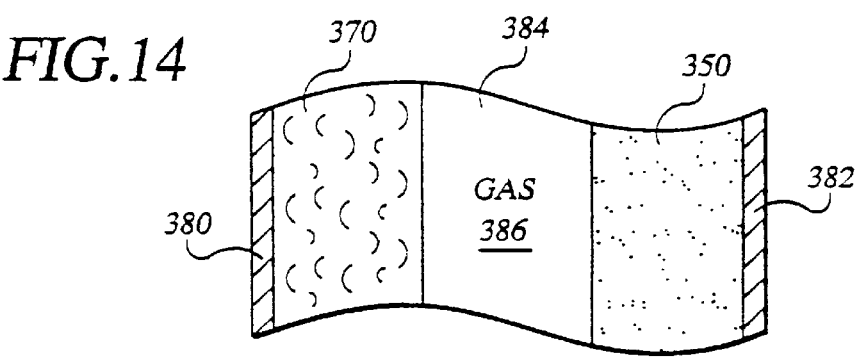
FIG. 14 is a schematic, cut-away view of a representative sidewall of an alternative embodiment of a container of the present invention.

As shown in FIG. 14, insulation 370 and temperature-maintaining material 350 are arranged between an outer wall 380 and an inner wall 382 of a container. Of particular interest, a gas chamber 384 is provided between the insulation and temperature-maintaining material. The gas chamber is adapted to receive gas 386, such as an inert gas, or other gas that is considered suitable for increasing the insulating properties of the container. Depending upon the particular properties of the insulation and temperature-maintaining material, these materials may be adequate for defining the gas chamber and maintaining the gas therebetween.

Figure 15:
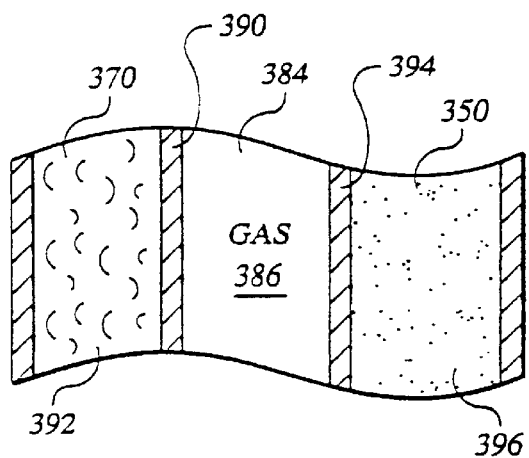
FIG. 15 is a schematic, cut-away view of a representative sidewall of an alternative embodiment of a container of the present invention.

Another embodiment that includes a gas chamber is depicted in FIG. 15. As shown in FIG. 15, the gas chamber 388, which is located between the insulation 370 and the temperature-maintaining material 350, is defined by an inner wall 390 of the insulation chamber 392 and an outer wall 394 of the temperature-maintaining material chamber 396. Thus, this embodiment uses additional structural elements for maintaining the location of the gas.

Figure 16:
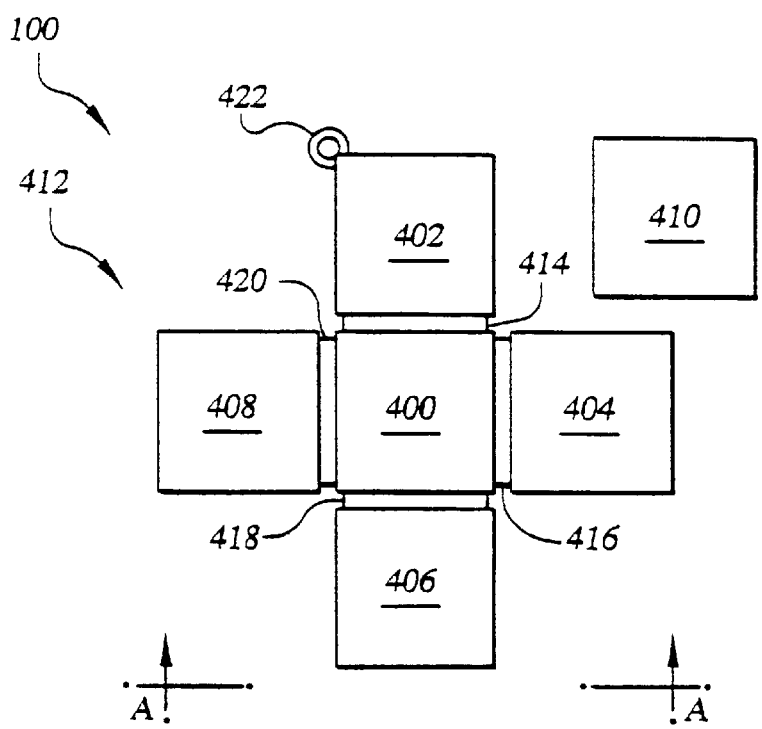
FIG. 16 is a schematic, plan view of an embodiment of the present invention in an unassembled or unfolded configuration.

As shown in FIG. 16, the base 400 and sidewalls 402, 404, 406 and 408 of a container 100 are depicted in a disassembled or unfolded configuration. In this configuration, the sidewalls and base exhibit a generally flattened structure. Note, the lid 410 is not attached to the basesidewall assembly 412. Note, hinge mechanisms 414, 416, 418 and 420 attach the sidewalls to the base. The embodiment of FIG. 16 also includes a hanging component 422, which in this case is a ring that can be used for hanging the container during storage, for example. For instance, the ring could attach the container to a hook suspended within a freezer.

Figure 17:
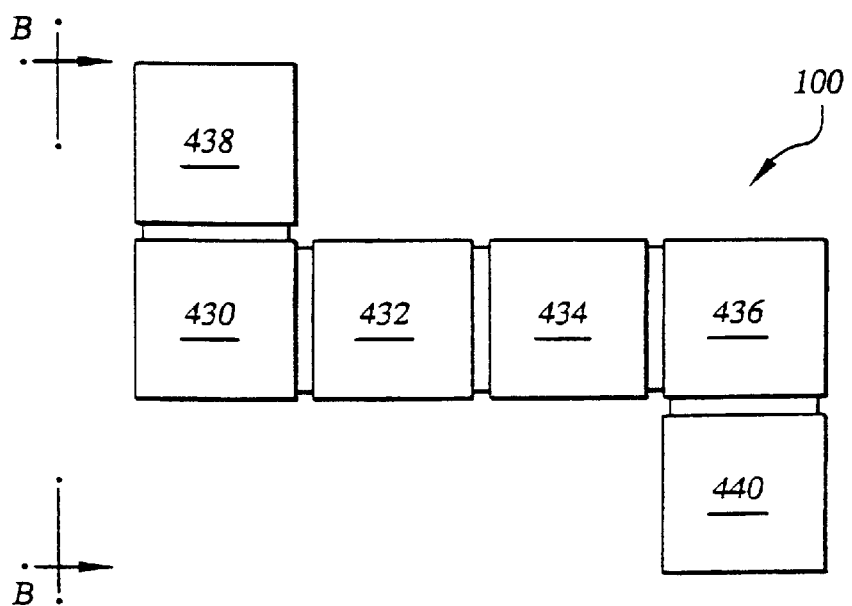
FIG. 17 is a schematic, plan view of an alternative embodiment of the present invention in an unassembled or unfolded configuration.

FIG. 17 also depicts an embodiment of a storage container 100 in its disassembled or unfolded configuration. In particular, sidewalls 430, 432, 434 and 436 are attached to base 400. Compared to the embodiment of FIG. 16, however, the embodiment of FIG. 17 includes a lid 442 that is hingedly attached to the unfolded structure. In particular, the lid is attached to sidewall 436.

In those embodiments that are configured to unfold into a generally flattened structure, it is shown that the space taken up by the structure is somewhat less than that used when the sidewalls and lid are assembled, such as depicted in FIG. 11. This unfolded configuration is considered advantageous, in that less volume is required within which to place the container. By way of example, when multiple containers are to be placed within a freezer so that the temperature-maintaining material can be frozen, more containers can be placed within the freezer in the unfolded configuration than would otherwise be able to be placed in the freezer when the containers are assembled.

Figure 18:
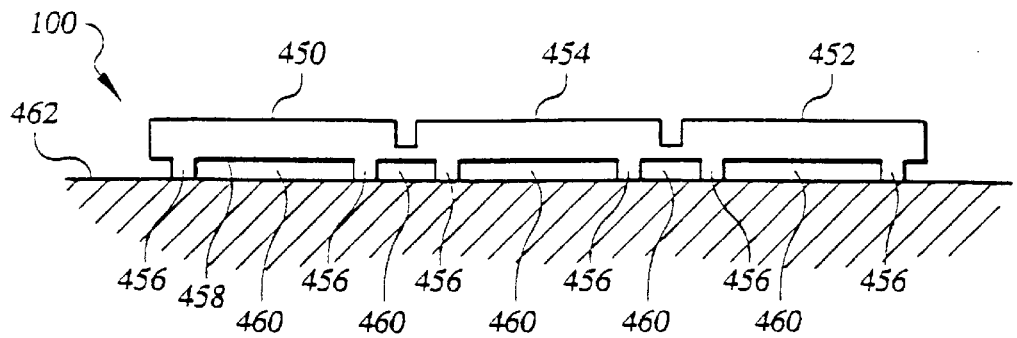
FIG. 18 is a schematic side view representative of both the embodiment of FIG. 15, as viewed from line A—A, and the embodiment of FIG. 16, as viewed along line B—B.

As shown in the schematic side view of FIG. 18, the lid 450, base 452, and/or one or more of the sidewalls 454 of a container 100 can include protrusions 456 that extend outwardly from an exterior surface 458 of the container 100. These protrusions can be used to form air flow channels 460 between the containers and the surface 462 upon which it is placed. Clearly, the number and arrangement of protrusions can vary among embodiments. Preferably, the protrusions are arranged in rows that are spaced parallel from each other.

Figure 19:
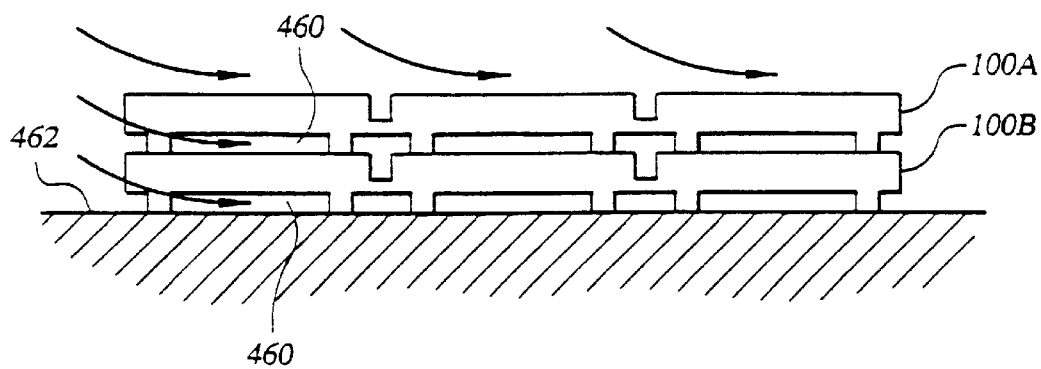
FIG. 19 is a schematic side view showing a stacking arrangement of containers of the invention.

In FIG. 19, two containers (100A, 100B) are shown stacked one upon the other. In this arrangement, air (depicted by arrows) is able to flow between the containers, as well as between the lowermost container and surface 462.

Figure 20:
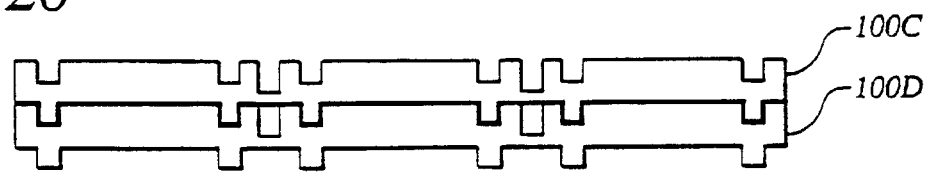
FIG. 20 is a schematic side view showing another stacking arrangement of containers of the invention.

As shown in FIG. 20, embodiments of containers 100 also can incorporate recesses 470, which are complimentary shaped with respect to the protrusions 456. Thus, the containers (100C, 100D) can nest within each other. Stacking the containers in a nested configuration enables the containers to take up less space, such as during shipping when they are not in use.

Figure 21:
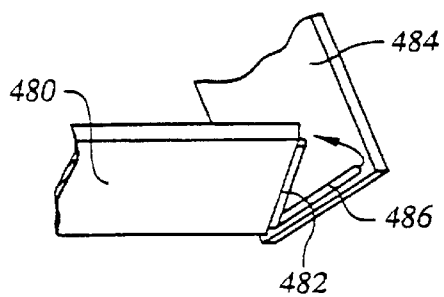
FIG. 21 is a partially cut-away, schematic view showing assembly detail of sidewalls of an embodiment of the present invention.

As depicted in FIG. 21, the sidewalls can incorporate mating components that are adapted to mate with each other to form a more rigid assembly and/or complete seal about the storage chamber. As shown in FIG. 21, sidewall 480 includes a protruding member 482, while sidewall 484 includes a complimentary shaped recess 486. The protruding member is received by the recess as the sidewalls are assembled, such as by moving sidewall 484 in the direction indicated by the arrow receiving the protruding member. In some embodiments, the protruding member and recess can include surfaces for forming an interference fit when the protruding member is inserted within the recess. Thus, by inserting the protruding member within the recess and forming the interference fit, a tendency for the sidewalls to separate from each other during use can be reduced.

Figure 22:
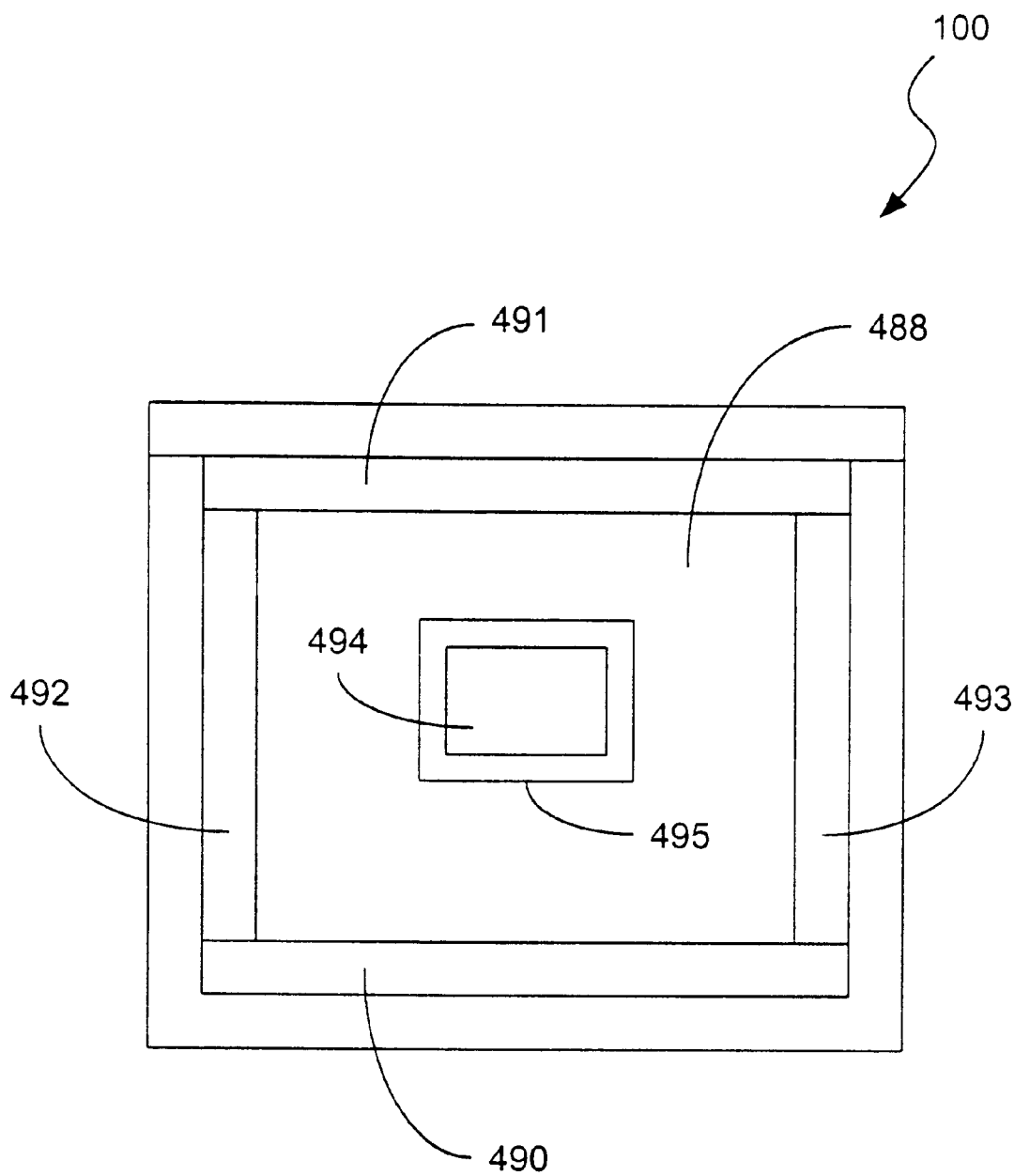
FIG. 22 is a schematic, cut-away view of an alternative embodiment of the container of the present invention.

Another embodiment of a storage container 100 is depicted schematically in FIG. 22. As shown in FIG. 22, storage container 100 defines an interior 488 within which items (not shown) can be placed. Temperature-maintaining material can be placed at various locations of the storage container. In the embodiment depicted in FIG. 22, temperature-maintaining material 490 is located at a bottom of the container, temperature-maintaining material 491 is located at the top of the container, temperature-maintaining material 492 is located at a first side of the container and temperature-maintaining 493 is located at a second side of the container. Also depicted in FIG. 22 is temperature-maintaining material 494 that is placed within the interior 488 and which, preferably, is not secured to the container. In particular, temperature-maintaining material 494 is stored within a container 495 that can be a bag or other structure that substantially retains the temperature-maintaining material. Typically, the container 495 is enabled to be moved about the interior although, in some embodiments, the container may be adapted to be maintained in a particular position within the interior.

Clearly, in other embodiments, temperature-maintaining material can be placed in one or more of the positions identified in FIG. 22. Note, the shape, size and/or thickness of the temperature-maintaining material can differ between embodiments.

Various materials can be used for forming embodiments of containers in accordance with the invention. By way of example, insulation that is incorporated into and/or fonns the walls, top and/or bottom of a container can be formed, at least partially of urethane and/or soy oil polyol. Of particular interest is the use of soy oil polyol, as this material is biodegradable. Thus, biodegradable containers that are suitable for one-time use can be provided. In some of these embodiments, an outer shell can be used For instance, a biodegradable material such as cardboard could be used as an outer shell that protects the insulation.

Typically, embodiments of containers in accordance with the invention include multiple material layers. Various materials and/or combinations of materials can be used to form each of the layers, with each of the layers performing one or more of the following functions: providing structural support for the container, insulating the container and protecting the container.

With respect to supporting the container structurally, various materials can be used. By way of example, soy oil polyol foam, urethane foam, polystyrene and cardboard are considered useful as these materials are relatively light in weight, are relatively rigid and suited for the application of coatings (described later). Additionally, soy oil polyol, urethane and polystyrene offer improved insulating properties and, thus, can enhance the insulative characteristics of the containers in which they are incorporated.

Various materials can be used to insulate the containers. In some embodiments, insulating properties of the containers are enhanced by one or more material layers in addition to the material(s), used to provide structural support for the container (described before). For example, one or more layers of soy oil polyol, urethane foam and/or polystyrene can be used. Additionally or alternatively, other materials, such as those applied as coatings, can be used. By way of example, coatings that incorporate ceramics, such as SUPERTHERM™ manufactured by Superior Products International of Shawnee, Kans. can be used. Materials such as SUPERTHERM™ can be applied to the interior and/or exterior of the containers. Specifically, the material can be applied to the material that provides structural support to the container. Additionally or alternatively, such a material can be applied to another material that is used to insulate the container.

Various materials also can be used to form an outer shell of a container. Such an outer shell can be used to protect the inner material layers of the container and, thereby, improves the durability of the container. This can allow the container to be used more than once. Various durable materials such as ureas, e.g., urea polymers and/or copolymers, cardboard, coatings that incorporate ceramics, such as SUPERTHERM™, epoxies, such as EPOXOTHERM™, and enamels, such polyurethane enamels, e.g., ENAMOGRIP™, can be used. Clearly, various other materials can be used to form an outer shell. Note, the material forming the outer shell also can provide enhancements in insulating characteristics of the container.

In some embodiments, the material used to form the insulation of a container also can be used to form an outer shell. In particular, various materials that form outer skins or hardened layers can be used. By way of example, ureas, e.g., urea polymers and/or copolymers, can be used to form insulated structures that incorporate hardened outer surfaces. Also, materials configured as foams can be used to form insulated structures with hardened outer surfaces. These hardened outer surfaces or skins typically form as the material contacts the form into which the material is placed.

Various types of temperature-maintaining materials also can be used. By way of example, acrylate-based superabsorbents can be used. For instance, polacrylate/polyalcohol polymers and/or copolymers, such as AP85-38 manufactured by Emerging Technologies, Inc. of Greensboro, N.C., Norsocryl D-60, LiquiBlock, AT-03S, LiquiBlock 88, LiquiBlock 75, LiquiBlock 44-0C, among others can be used.

As described before, temperature-maintaining material can be incorporated into a container in various manners, such as by disposing the material between adjacent walls of the container and/or providing the temperature-maintaining materials in a package that can be placed within the interior of the container. Note, in use, the polymers/copolymers are allowed to absorb liquid, such as water, and the temperature of the temperature-maintaining materials can be adjusted as desired.

As mentioned before, containers of the invention can be used for storing items, while maintaining, increasing or decreasing the temperature of the items stored in the containers. The various functions associated with the containers of the invention will now be described with respect to several flowcharts. In this regard, FIG. 23 is a flowchart depicting a method in accordance with the invention.

Figure 23:
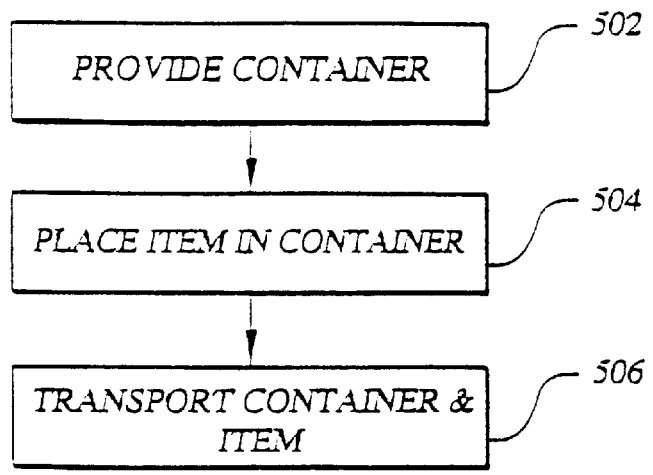
FIG. 23 is a flowchart depicting functionality of a method in accordance with the present invention.

As shown in FIG. 23, the method may be construed as beginning at block 502, where an embodiment of a container of the invention is provided. In block 504, an item is placed in the container. In block 506, the container with the item inserted therein can be transported.

Various items can be stored and/or transported within containers of the invention. For instance, food products, beverages, pharmaceutical products, and biological matter, such as plants, tissues, organs, and blood can be stored and/or transported within the containers. Clearly, various other items could be used with embodiments of the invention, particularly those items that may require their respective temperatures to be maintained, reduced and/or increased for a period of time, such as during transport.

Figure 24:
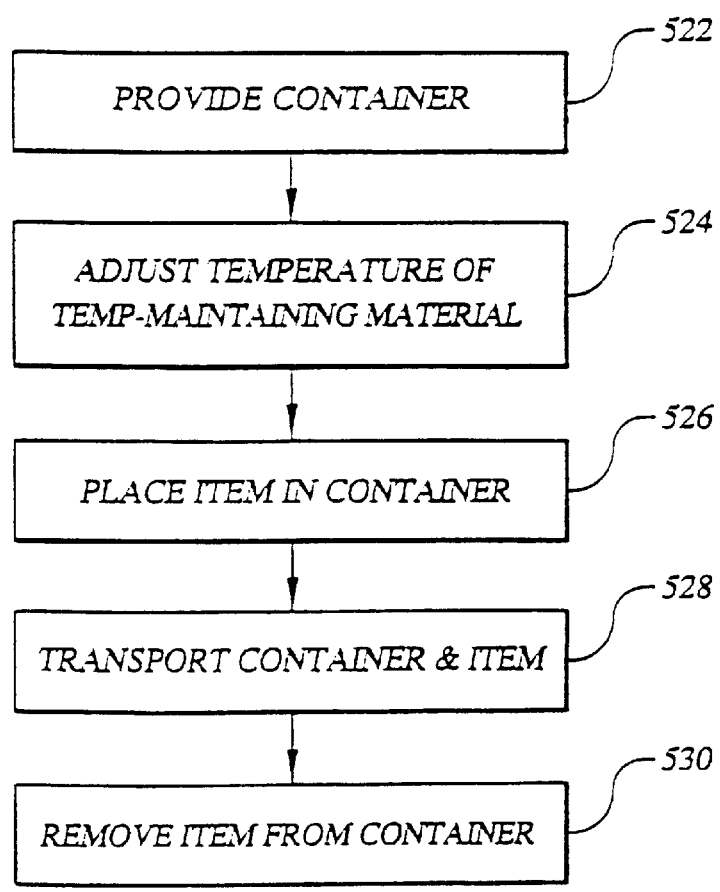
FIG. 24 is a flowchart depicting functionality in accordance with another method of the present invention.

As depicted in FIG. 24, another method in accordance with the invention may be construed beginning at block 522, where a container is provided. In block 524, the temperature-maintaining material of the container is adjusted to exhibit a selected temperature. By way of example, when the temperature-maintaining material is a refreezable material, the material can be frozen. In block 526, an item is placed within the container and, thereafter (block 528), the container with the item stored therein is transported. In block 530, the item is removed from the container, such as by accessing the storage chamber and removing the item from the storage chamber. Based upon the configuration of the container and the time the item has been stored within the container, the item preferably exhibits desired temperature characteristics.

Figure 25:
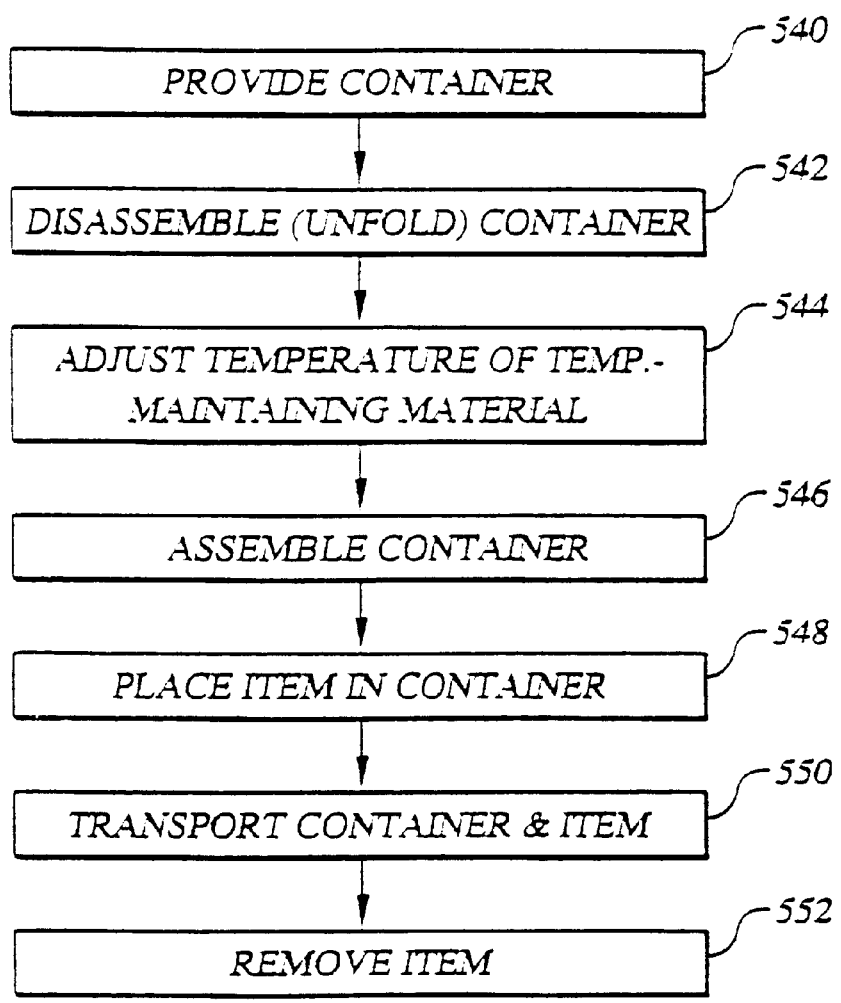
FIG. 25 is a flowchart depicting functionality in accordance with still another method of the present invention.

Another method of the invention is depicted in FIG. 25. As shown in FIG. 25, the method may be construed as beginning at block 540, where a container in accordance with the invention is provided in a disassembled or unfolded configuration. In block 542, the temperature of the temperature-maintaining material of the container is adjusted. In block 544, the container is assembled and, such as depicted in block 548, an item is placed within a storage chamber of the assembled container. In block 550, the container with the item inserted therein is transported to an intended destination and, in block 552, the item is removed from the container.

Several prototype containers were constructed in accordance with the invention and were subjected to testing. Results from the tests conducted will now be described.

EXAMPLE 1

Figure 26:
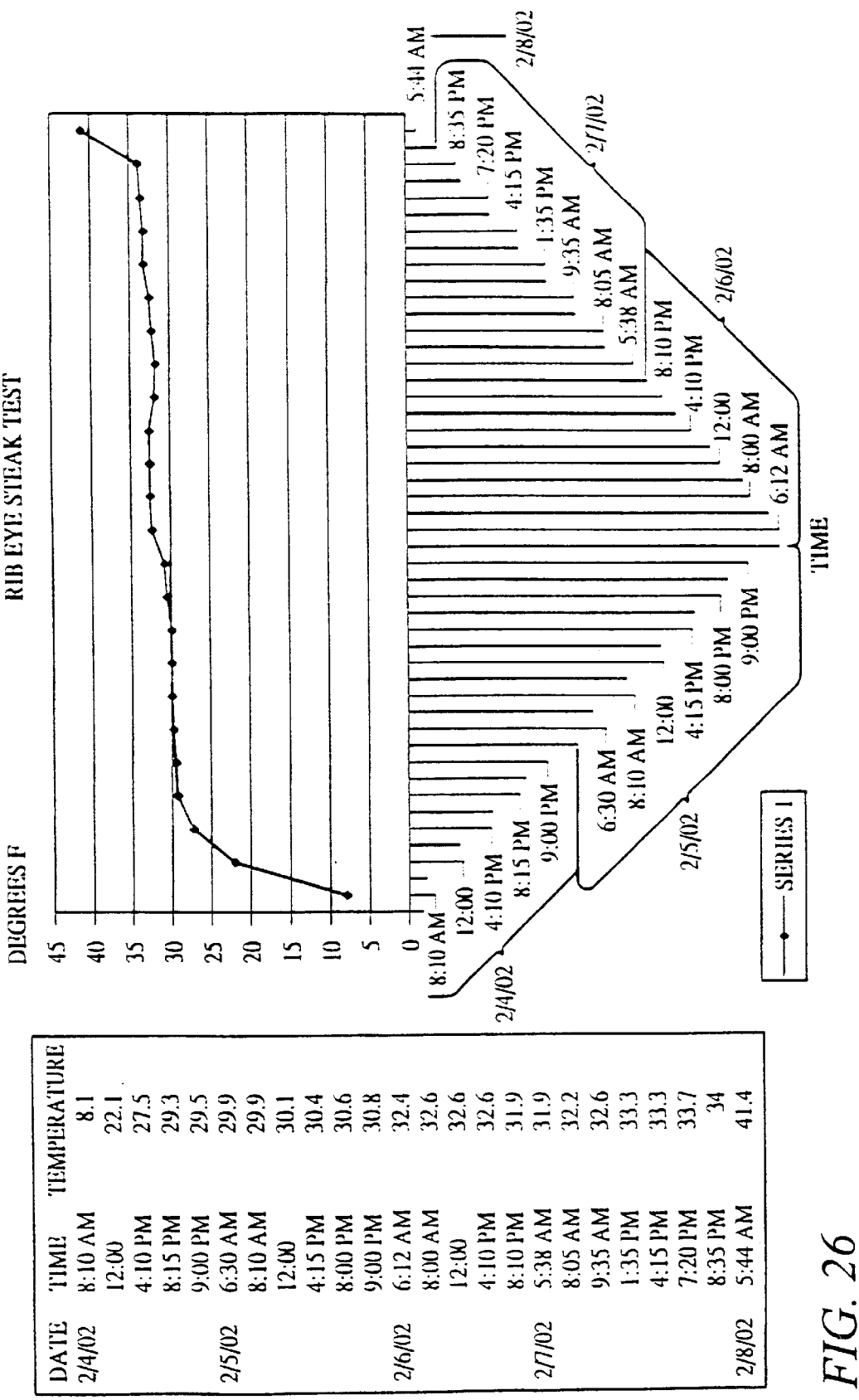
FIGS. 26–33 are graphs depicting time versus temperature involving storage of items in various embodiments of the present invention.

In this example, a container was formed as a 6"×6"×6" box with 1.5" thick polyurethane insulation. The insulating material surrounded temperature-maintaining material in the form of a gel-forming polymer. Approximately 24 ounces of gel-forming polymer was located at the base of the container, 16 ounces of the polymer was located at the lid or top of the container. The item placed in the storage chamber was 0.74 lbs. of steak, which was placed into the storage chamber after the steak and the container were allowed to cool to a temperature of 4.9° F. The container with the item stored therein was then placed in an ambient environment which was approximately 75° F. The results of this example are depicted in FIG. 26.

EXAMPLE 2

Figure 27:
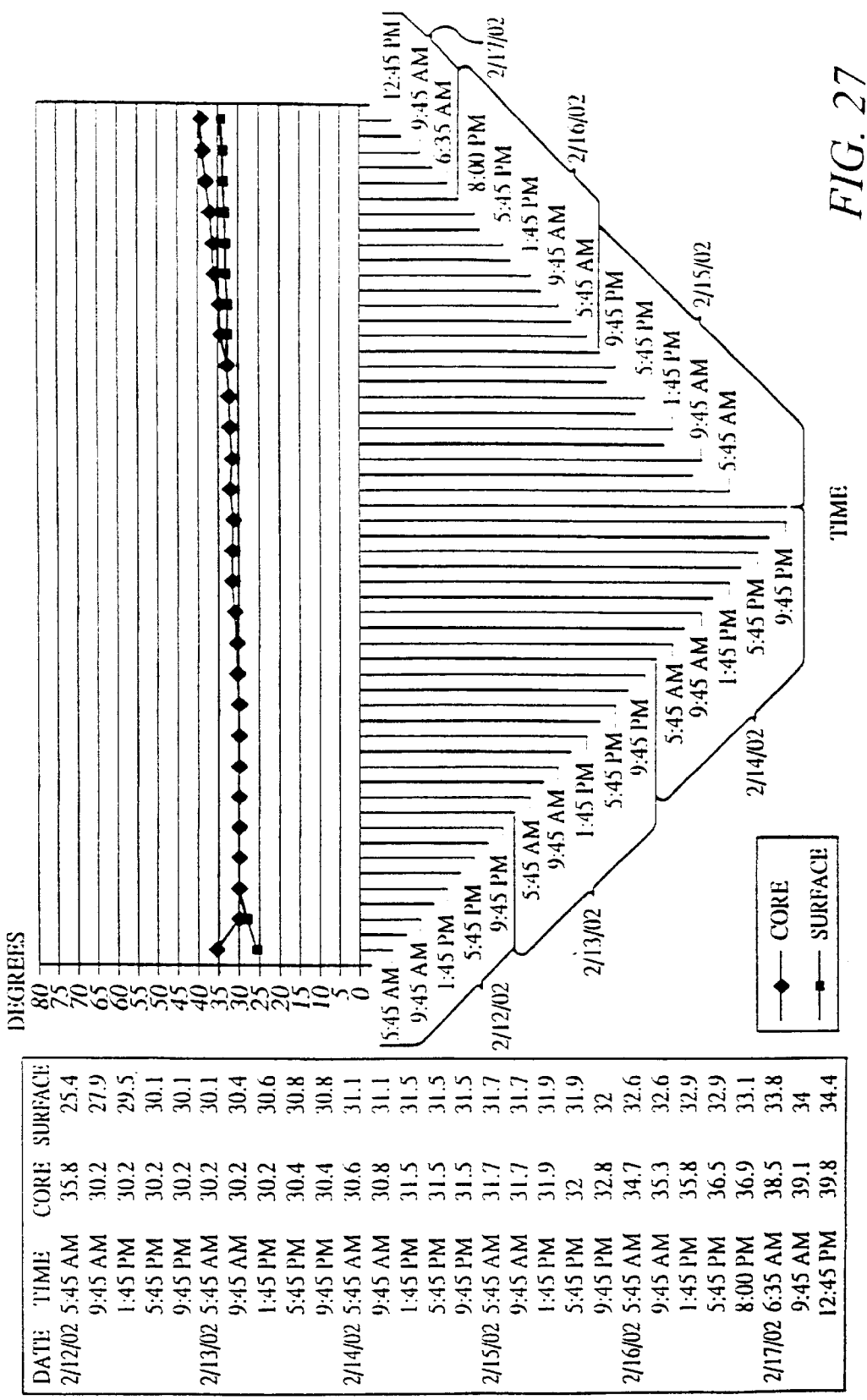

In this example, another container (8.5"×8.5"×8.25") was formed with 1.5" polyurethane insulation. Twenty-four ounces of gel-forming polymer was located at the base, 16 ounces of gel-forming polymer was located at each of the sidewalls, 16 ounces of gel-forming polymer was located at the lid, and 4 ounces of gel-forming polymer was located at each of the 4 corners of the container. Ground beef, (1.87 lbs.) was inserted into the storage chamber, which was then cooled to 35.8° F. After cooling, the container was placed in an ambient environment of approximately 75° F. As depicted in FIG. 27, the ground beef was maintained at or below 40° F. for approximately 127 hours.

EXAMPLE 3

In this example, a cylindrical container (see FIG. 10) was formed with 6 oz. of foam-type insulation. Five ounces of gel-forming polymer was located in a gap formed between the inner shell and the insert. The outer shell, insert and inner shell were formed of plastic.

Figure 28:
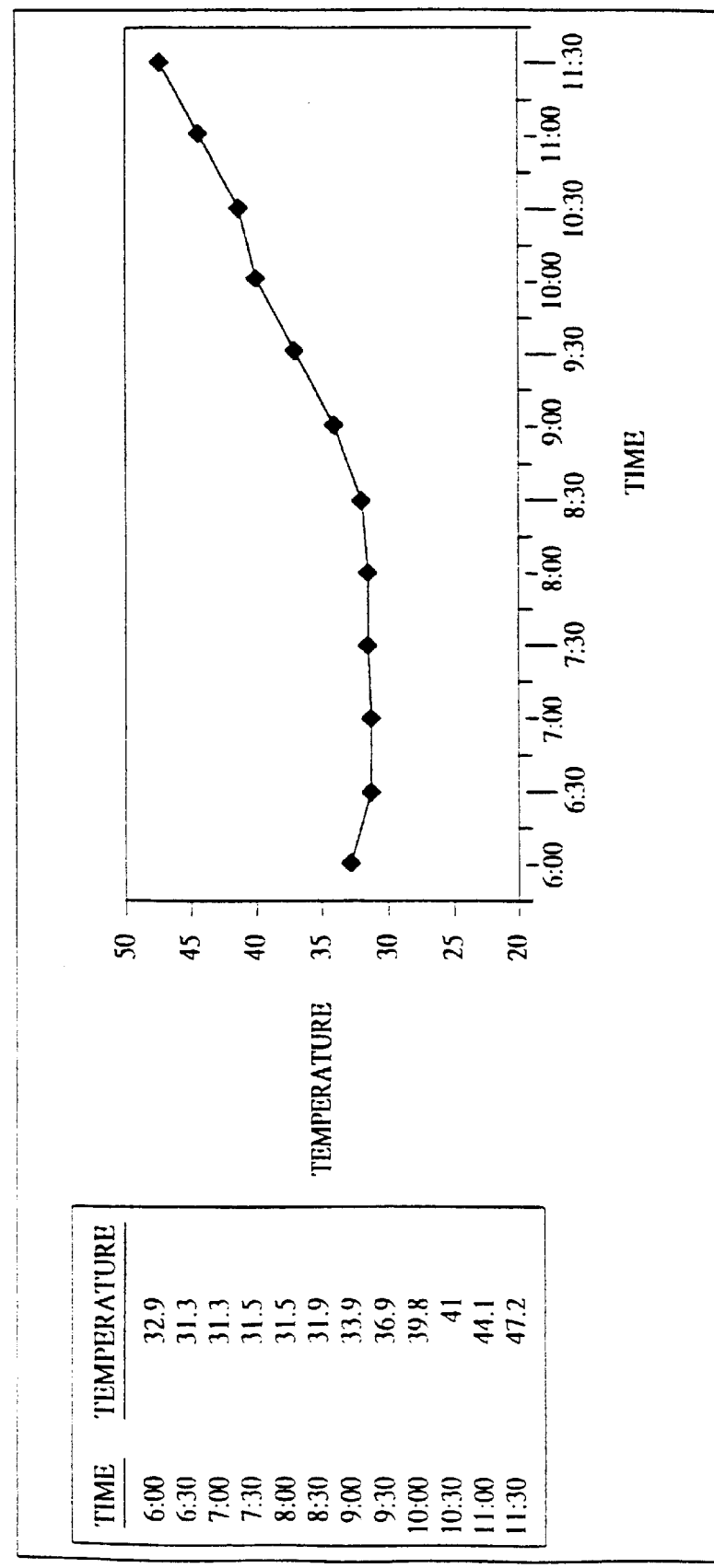

The container was placed in a freezer, which was maintained at 1.5° F. Two cans of Bud Light® were placed in a refrigerator, which was maintained at 33.1° F. After removing the container from the freezer, the cans were placed inside the container. The container with the stored can were then placed in a room with an ambient temperature of 75.5° F. Results are depicted in FIG. 28.

EXAMPLE 4

Figure 29:
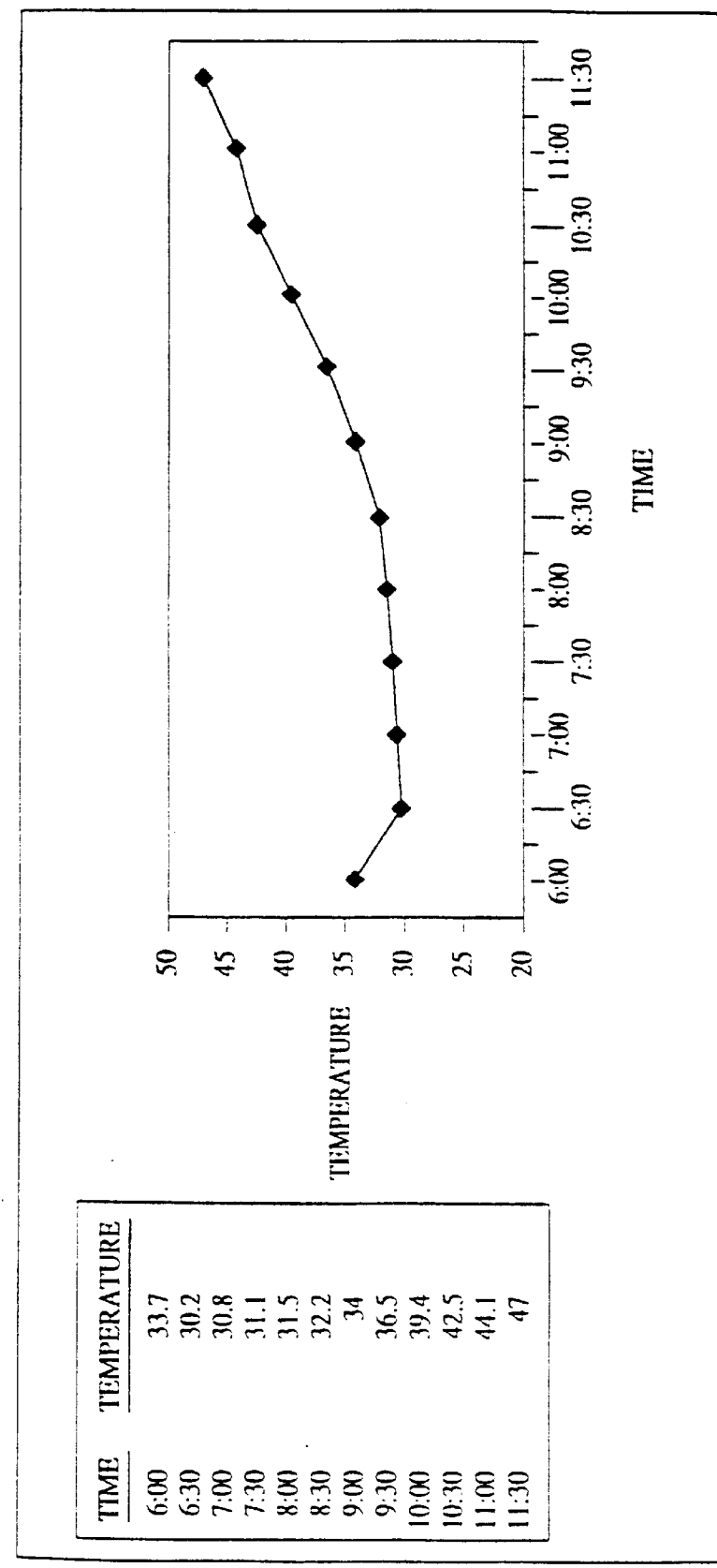

The container used in example 3 was used again in this example. This time, the container was placed in a freezer, which was maintained at 3.6° F. Two cans of Bud Light® were placed in a refrigerator, which was maintained at 33.7° F. After removing the container from the freezer, the cans were placed inside the container, which was placed in a room with an ambient temperature of 75.5° F. Results are depicted in FIG. 29.

EXAMPLE 5

The container used in examples 3 and 4 was used again in this example. Two cans of Diet Coke® were inserted in the container with the container exhibiting a temperature of 4.3° F. at start, with each of the cans exhibiting a start temperature of 37.5° F. The container with the stored cans was then placed in an ambient environment of 70° F.

Figure 30:
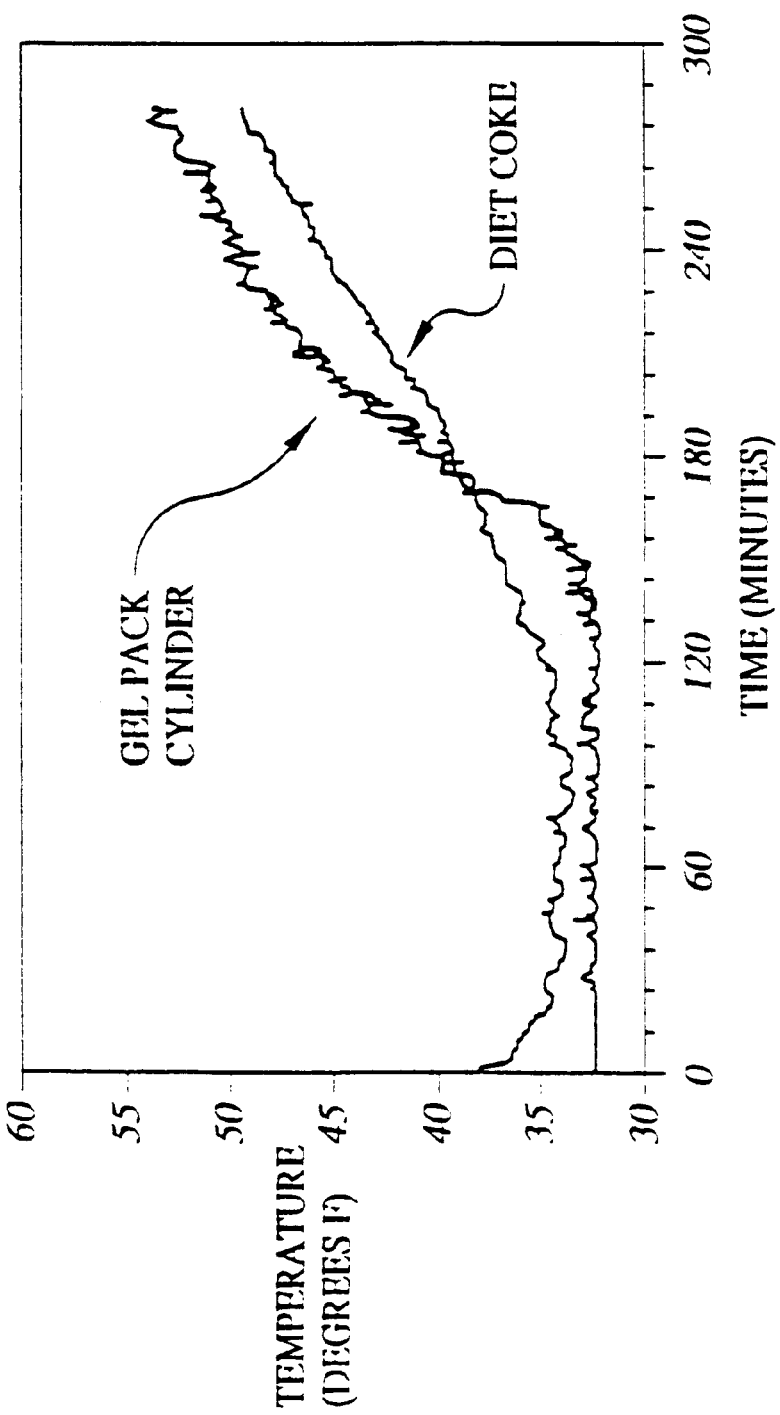

As depicted in FIG. 30, the beverages were maintained at temperatures of less than 37° F. for approximately two hours. Due to the large number of data points, the curve shown represents a moving average of the data point values. Note, the temperature of the beverages dropped for approximately 30 minutes to 34° F. and stabilized for approximately 90 minutes. The temperature began to rise and reached approximately 37° F. at approximately 150 minutes, then continued to rise to 40° F. at approximately 190 minutes.

EXAMPLE 6

In this example, a container in a box-type configuration was used. Approximate dimensions of the container are 1.25'×1.25'×1.25'. Ten pouches of gel-forming polymer, weighing a total of 7.8 lbs., were used. The polymer was cooled to approximately 4° F. and inserted into the storage chamber of the container. In particular, the bags were placed on the bottom, sides, corners and top of the storage chamber. Hamburger meat (3"×8"×4") weighing approximately 7.8 lbs. and exhibiting an initial temperature of 23.4° F. was then placed in the container.

Figure 31:
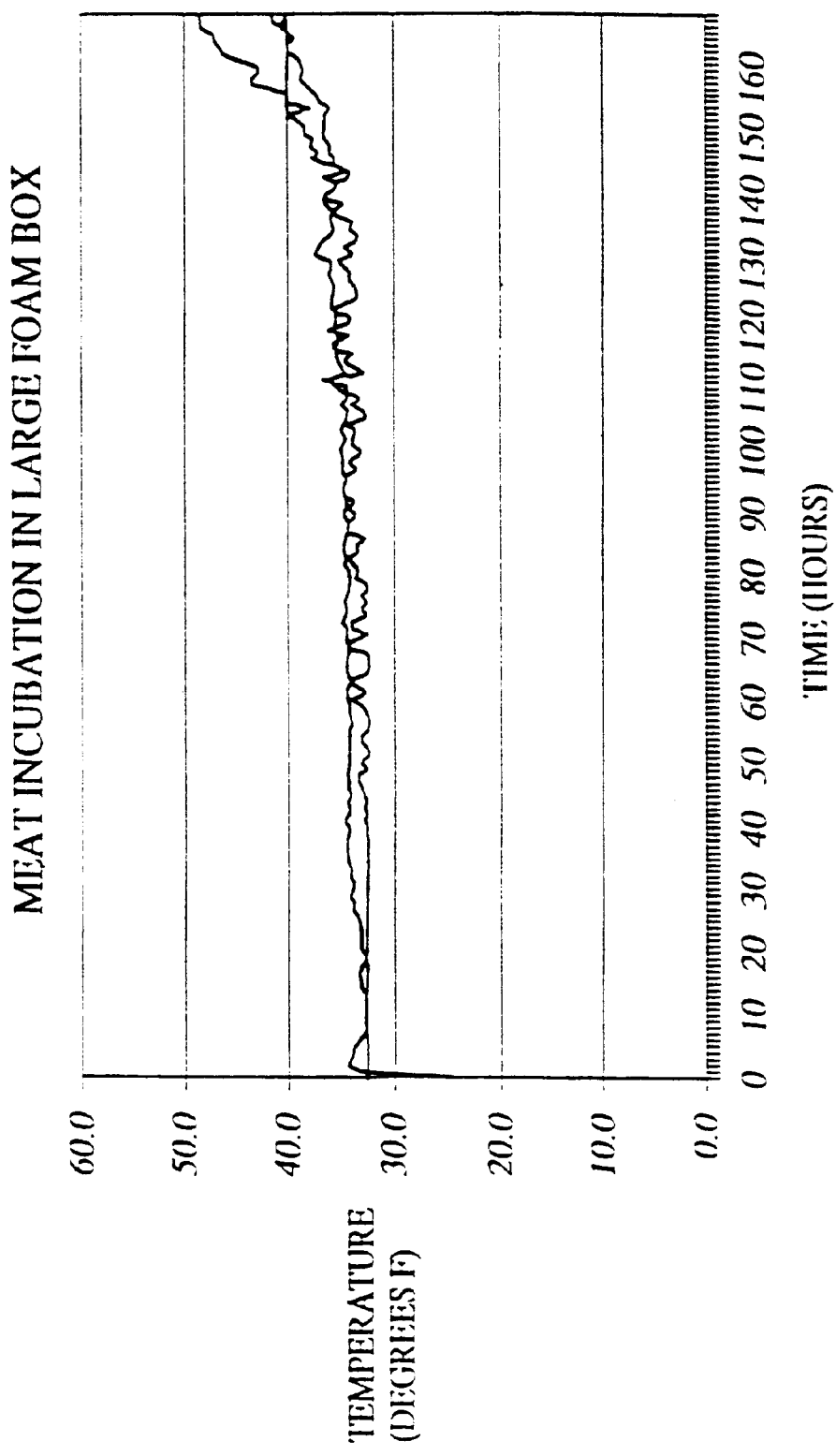

FIG. 31 shows the temperature profile which indicates that the meat climbed to a temperature of 32° F. within one hour. The temperature at the gel/meat interface remained constant at 34° F. for approximately 110 hours, then began a very slow increase to 39° F. over the next 50 hours. After 166 hours, the container was opened and the meat was removed. Approximately one inch of the meat against the gel packs appeared brown in color, while the center of the meat was natural red in color.

EXAMPLE 7

In this example, the container of example 6 was used to determine the viability of antifreeze/gel-forming polymer-based refreezable material to maintain the temperature of items. In particular, one pint vanilla Haggendas® ice cream was placed in the container.

Figure 32:
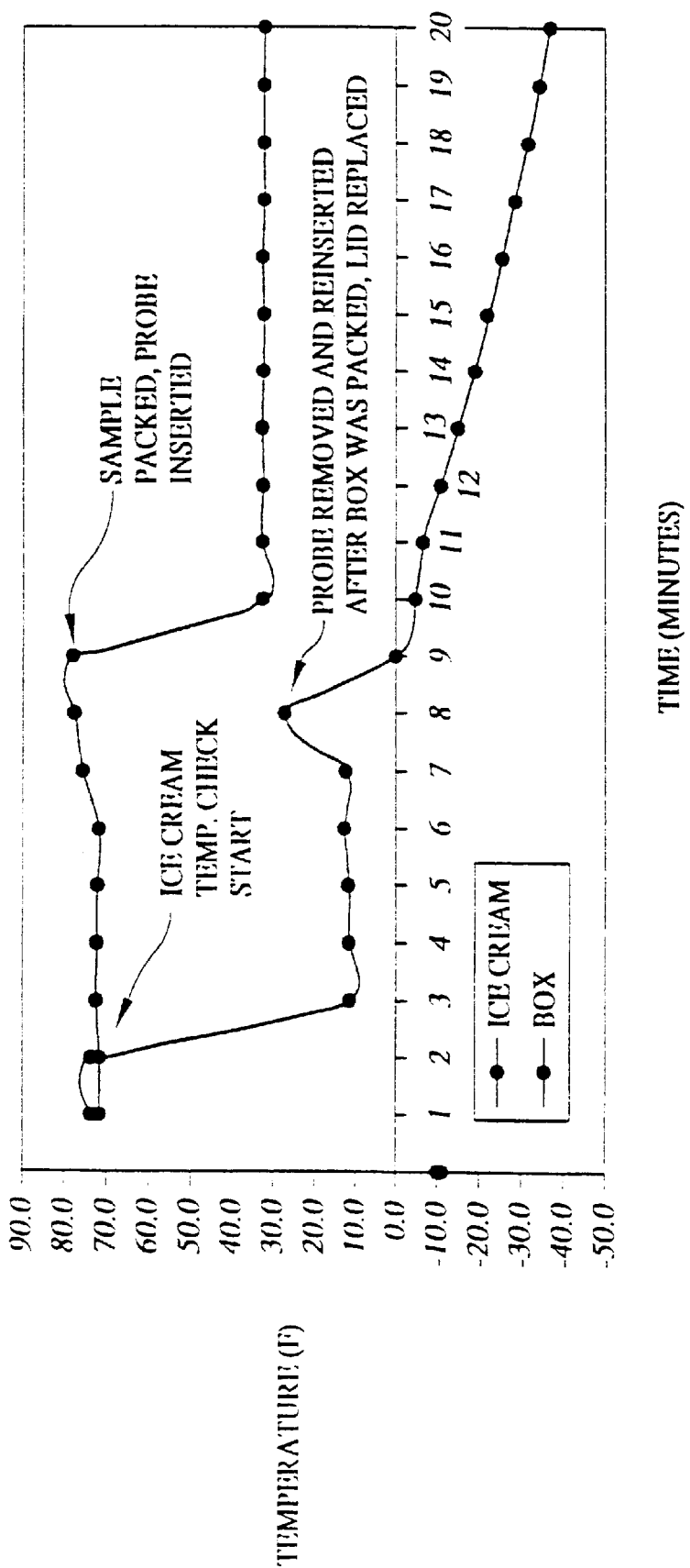
Figure 33:
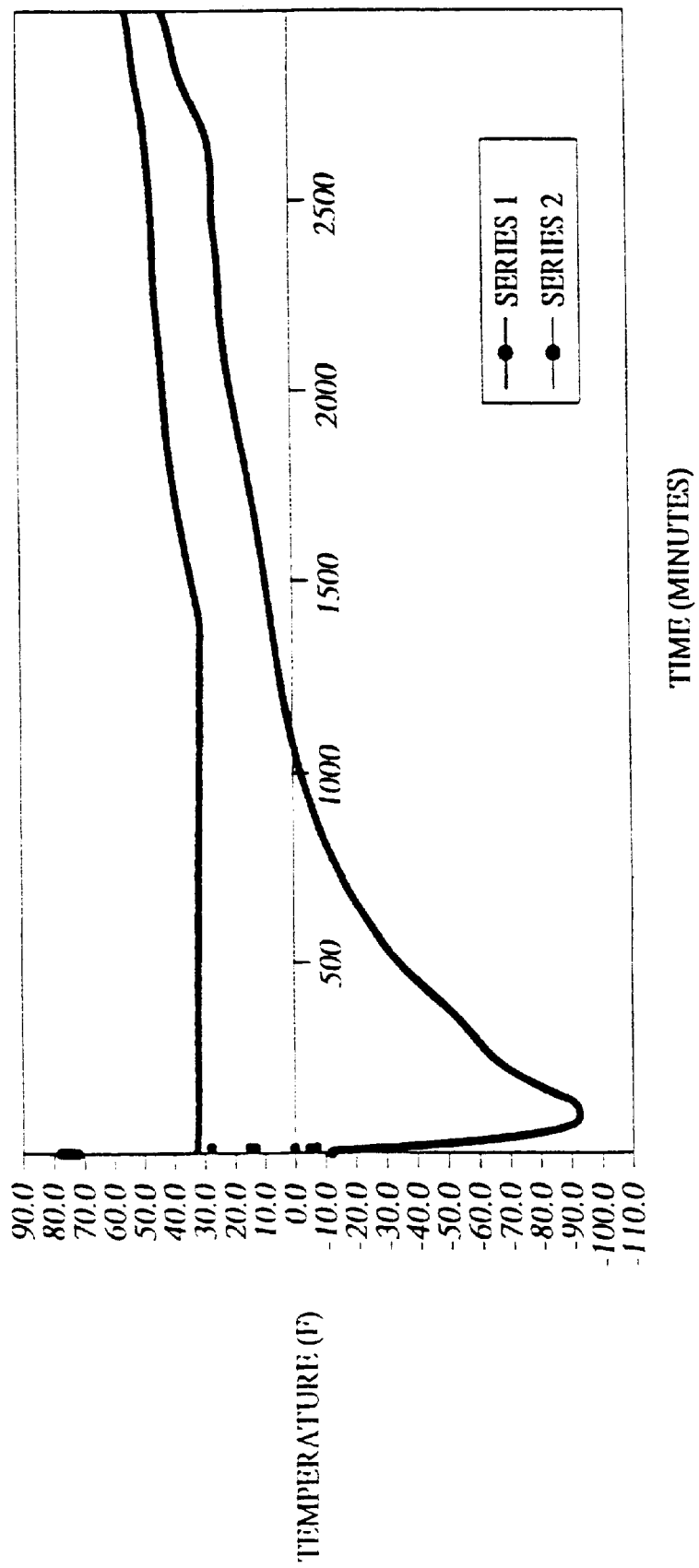

A 75:25 mixture of antifreeze (ethylene glycol) and water was mixed with 2.5 teaspoons of a dry polymer gel. Approximately 2.03 lbs. of the mixture was then dispensed into 6 Ziplock® bags and frozen in liquid nitrogen. The frozen bags and the ice cream, which had an initial temperature of 11° F., were placed in the storage chamber. The container was maintained at room temperature (72–74° F.) for 68 hours. The results are depicted in the graph of FIGS. 31 and 32.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A container for storing an item comprising:
   an outer shell defining an interior and having a lid, the outer shell having at least one opening for providing access to the interior, the lid being movable between an open position and a closed position, in the closed position the outer shell encasing the interior, in the open position the lid providing access to the interior, the outer shell comprising cardboard;
   a storage chamber formed within the interior and communicating with the opening, the storage chamber being adapted to receive at least one item;
   insulating material disposed within the interior between the storage chamber and the outer shell; and
   temperature-maintaining material disposed within the interior, the temperature-maintaining material comprising a super-absorbent.

2. The container of claim 1, wherein the insulating material comprises a ceramic-containing coating applied to the cardboard.

3. The container of claim 2, wherein the ceramic-containing coating is applied to the interior and the exterior of the cardboard.

4. The container of claim 1, wherein the super-absorbent is an acrylate-based super-absorbent.

5. The container of claim 1, wherein the insulating material comprises at least one of soy oil polyol foam, urethane foam and polystyrene foam.

6. The container of claim 1, wherein an exterior of the insulating material is coated with at least one of an urea polymer, an urea copolymer, a ceramic-containing coating, a polyurethane enamel and an epoxy.

7. The container of claim 1, further comprising means for coating the exterior of the insulating material.

8. A container for storing an item comprising:
   an outer shell defining an interior;
   an insulating material disposed at least partially within the interior, the insulating material comprising soy oil polyol; and
   a temperature-maintaining material disposed within the interior, the temperature-maintaining material comprising an acrylate-based super-absorbent.

9. The container of claim 8, wherein the outer shell and the insulating material comprise soy oil polyol, the soy oil polyol being configured with a foamed portion and a hardened outer skin, the insulating material corresponding to the foamed portion, the outer shell corresponding to the hardened outer skin.

10. The container of claim 8, wherein the outer shell comprises at least one of an urea polymer and an urea copolymer, applied as a coating to an exterior of the container.

11. The container of claim 8, further comprising a ceramic-containing coating applied to the exterior of the insulating material.

12. The container of claim 11, wherein the ceramic-containing coating is SUPERTHERM™.

13. The container of claim 8, wherein the outer shell comprises cardboard.

14. The container of claim 8, wherein the outer shell comprises at least one of an urea polymer, an urea copolymer, a polyurethane enamel and an epoxy.

15. The container of claim 14, wherein the epoxy is EPOXYTHERM™.

16. The container of claim 8, wherein the outer shell, the insulating material, and the temperature-maintaining material are biodegradable.

17. The container of claim 8, wherein the insulating material is a urethane.

18. The container of claim 8, further comprising a ceramic-containing coating applied to the outer shell.

19. The container of claim 18, wherein the ceramic-containing coating is applied to the exterior of the outer shell.

20. The container of claim 18, wherein the ceramic-containing coating is SUPERTHERM™.

21. A container for storing an item comprising:
    an outer shell defining an interior, the outer shell comprising at least one of a ceramic-containing-material and an epoxy;
    an insulating material disposed at least partially within the interior, the insulating material comprising at least one of soy oil polyol foam, urethane foam and polystyrene foam; and
    a temperature-maintaining material disposed within the interior, the temperature-maintaining material comprising a super-absorbent.

22. The method of claim 21, wherein the ceramic-containing material is applied to at least a portion of an exterior of the insulating material.

23. The method of claim 22, wherein the ceramic-containing material is applied to at least a portion of an interior of the insulating material.

24. The method of claim 21, wherein the ceramic-containing material is SUPERTHERM™.

25. The method of claim 21, wherein the epoxy is applied to at least a portion of an exterior of the insulating material.

26. The method of claim 22, wherein the epoxy is applied to at least a portion of an interior of the insulating material.

27. The method of claim 21, wherein the epoxy is EPOXYTHERM™.

28. A method for storing items, said method comprising:
providing a container, the container having:
an outer shell defining an interior and having a lid, the outer shell having at least one opening for providing access to the interior, the lid being movable between an open position and a closed position, in the closed position the outer shell encasing the interior, in the open position the lid providing access to the interior, the outer shell comprising cardboard;
a storage chamber formed within the interior and communicating with the opening, the storage chamber being adapted to receive at least one item;
insulating material disposed within the interior between the storage chamber and the outer shell; and
temperature-maintaining material disposed within the interior, the temperature-maintaining material comprising a super-absorbent.

29. The method of claim 28, further comprising:
placing an item in the storage chamber of the container.

30. The method of claim 29, further comprising:
transporting the container with the item stored therein.

31. The method of claim 28, further comprising:
freezing the temperature-maintaining material.

32. A container for storing an item comprising:
an outer shell defining an interior and having at least one opening for providing access to the interior, the outer shell being formed of a substantially rigid material;
a storage chamber within the interior and communicating with the opening, the storage chamber being adapted to receive at least one item; and
insulating material disposed within the interior between the storage chamber and the outer shell, the insulating material comprising oil of at least one vegetable.

33. The container of claim 32, wherein the oil comprises soy oil.

34. The container of claim 32, wherein the insulating material is a urethane.

35. The container of claim 32, further comprising a temperature-maintaining material disposed within the interior, and
wherein the insulating material is a urethane comprising soy oil.

36. The container of claim 32, further comprising a lid movable between an open position and a closed position, in the closed position the lid preventing access to the storage chamber, in the open position the lid providing access to the storage chamber.

37. The container of claim 32, wherein the lid includes a recess such that, in the closed position, at least a portion of the insulating material is received by the recess.

38. The container of claim 32, wherein an outer shell comprises cardboard.

39. A container for storing an item comprising:
an insulating material defining a storage chamber and an opening, the opening communicating with the storage chamber, the storage chamber being adapted to receive at least one item via the opening, the insulating material being a urethane comprising vegetable oil; and
a temperature-maintaining material arranged to maintain a temperature of an item placed in the storage chamber.

40. The container of claim 39, wherein a temperature-maintaining material comprises a superabsorbent.

41. The container of claim 39, wherein the superabsorbent is acrylate-based.

42. The container of claim 39, wherein the vegetable oil comprises soy oil.

43. The container of claim 39, further comprising a lid movable between an open position and a closed position, in the closed position the lid preventing access to the storage chamber, in the open position the lid providing access to the storage chamber.

44. The container of claim 43, wherein the lid includes a recess such that, in the closed position, at least a portion of the insulating material is received by the recess.

45. A container for storing an item comprising:
an outer shell defining an interior and having at least one opening for providing access to the interior, the outer shell being formed of a substantially rigid material;
a lid configured to engage the outer shell and being movable between an open position and a closed position, in the closed position the lid engaging the outer shell such that the lid and the outer shell encase the interior, in the open position the lid providing access to the interior;
a storage chamber formed within the interior and communicating with the opening, the storage chamber being adapted to receive at least one item;
insulating material disposed within the interior between the storage chamber and the outer shell, said insulating material comprising soy oil polyol; and
temperature-maintaining material disposed within the interior.

46. The container of claim 45, further comprising:
an inner wall spaced from the outer shell and located between the outer shell and the storage chamber.

47. The container of claim 46, wherein at least some of the temperature-maintaining material is disposed between the inner wall and the insulating material.

48. The container of claim 45, further comprising a temperature-maintaining material container; and
wherein the temperature-maintaining material is located within the temperature-maintaining material container.

49. The container of claim 45, wherein the temperature-maintaining material comprises an acrylate-based super-absorbent.

50. The container of claim 45, wherein the outer shell comprises cardboard.

51. The container of claim 45, wherein the outer shell and the insulating material are integrally formed of soy oil polyol.

52. A method for shipping an item, said method comprising:
providing a container comprising:
an outer shell defining an interior and having at least one opening for providing access to the interior, the outer shell being formed of a substantially rigid material;
a storage chamber within the interior and communicating with the opening, the storage chamber being adapted to receive at least one item; and
insulating material disposed within the interior between the storage chamber and the outer shell, the insulating material comprising oil of at least one vegetable;
storing the item within the storage chamber; and
transporting the container with the item stored therein.

53. The method of claim 52, wherein the vegetable oil comprises soy oil.

54. The method of claim 53, wherein the outer shell comprises cardboard.

55. A method for shipping an item, said method comprising:
- providing a container comprising:
  - an insulating material defining a storage chamber and an opening, the opening communicating with the storage chamber, the storage chamber being adapted to receive at least one item via the opening, the insulating material being a urethane comprising a bio-based material; and
  - a temperature-maintaining material arranged to maintain a temperature of an item placed in the storage chamber;
- storing the item within the storage chamber; and
- transporting the container with the item stored therein.

56. The method of claim 55, wherein the bio-based material comprises vegetable oil.

57. The method of claim 56, wherein the vegetable oil comprises soy oil.

58. The method of claim 55, further comprising a lid movable between an open position and an open position, in the closed position the lid preventing access to the storage chamber, in the open position the lid providing access to the storage chamber.

59. The method of claim 58, wherein the lid includes a recess such that, in the closed position, at least a portion of the insulating material is received by the recess.

60. The method of claim 58, wherein the outer shell comprises cardboard.

* * * * *